(12) United States Patent
Yoshimoto et al.

(10) Patent No.: US 6,325,190 B1
(45) Date of Patent: Dec. 4, 2001

(54) TRANSMITTING SYSTEM FOR SMALL SIZED VEHICLE

(75) Inventors: Tokuji Yoshimoto; Seiji Makita, both of Shizuoka; Teruo Kihara, Wako, all of (JP)

(73) Assignees: Yutaka Giken Co., Ltd., Shizouka; Honda Giken Kogyo Kabushiki Kaisha, Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/438,422

(22) Filed: Nov. 12, 1999

(30) Foreign Application Priority Data

Nov. 13, 1998 (JP) .................................................. 10-324280
Nov. 20, 1998 (JP) .................................................. 10-331554

(51) Int. Cl.⁷ .................................................. F16D 47/02
(52) U.S. Cl. ...................................... 192/3.21; 192/113.5
(58) Field of Search ............................... 192/3.21, 113.1, 192/113.5; 60/339

(56) References Cited

U.S. PATENT DOCUMENTS

| 1,963,720 | * | 6/1934 | Sinclair | ................................... 60/339 |
| 2,107,089 | * | 2/1938 | Swennes | ........................ 192/3.21 X |
| 2,430,258 | * | 11/1947 | Thompson | ............................. 60/339 |
| 2,701,948 | * | 2/1955 | Iavelli et al. | ........................... 60/339 |
| 4,131,184 | | 12/1978 | Rumyantsev et al. . | |
| 4,163,399 | | 8/1979 | Yamada et al. . | |
| 4,376,370 | * | 3/1983 | Kinugasa et al. | ................... 60/339 X |
| 5,400,884 | * | 3/1995 | Matsuoka | ........................ 192/3.21 X |
| 5,417,315 | | 5/1995 | Fukunaga . | |

FOREIGN PATENT DOCUMENTS

| 1 327 921 | 9/1963 | (FR) . |
| 1 359 669 | 8/1964 | (FR) . |
| 2 732 428 | 10/1996 | (FR) . |
| 55-69355 | * 5/1980 | (JP) ..................................... 192/3.21 |
| 57-69163 | 4/1982 | (JP) . |

* cited by examiner

Primary Examiner—Rodney H. Bonck
(74) Attorney, Agent, or Firm—Arent Fox Kintner Plotkin & Kahn, PLLC

(57) ABSTRACT

In a transmitting system for a small-sized vehicle in which a crankshaft of an engine and an input shaft of a multi-stage transmission are connected to each other through a fluid transmitting device, the fluid transmitting device and a shifting clutch are mounted on the crankshaft. One of the fluid transmitting device and the shifting clutch is connected to the crankshaft, while the other is connected to the input shaft of the multi-stage transmission through a primary reducing device. Provided in the crankshaft are an upstream supply oil passage connected to an oil pump, a downstream supply oil passage connected to portions to be lubricated of the engine, a flow-in bore which permits the upstream supply oil passage to communicate with the inside of the fluid transmitting device, and a flow-out bore which permits the inside of the fluid transmitting device to communicate with the downstream supply oil passage.

5 Claims, 17 Drawing Sheets

TRANSMITTING SYSTEM FOR SMALL SIZED VEHICLE

BACKGROUND OF THE INVENTION

1. Field of the Invention

The present invention relates to a transmitting system utilized in a small-sized vehicle such as a motorcycle, a four-wheel buggy and the like, and particularly, to an improvement in a transmitting system utilized in a small-sized vehicle, in which a crankshaft of an engine and an input shaft of a multi-stage transmission, which is disposed in parallel to the crankshaft, are leading to each other through a fluid transmitting means including a pump impeller leading to the engine, and a turbine impeller connected to the multi-stage transmission.

2. Description of the Related Art

There are such already known transmitting systems for small-sized vehicles, in which the fluid transmitting means is comprised of a torque converter, as disclosed in, for example, Japanese Patent Application Laid-open No. 57-69163.

In such known transmitting system, as described in the above Publication, the crankshaft of the engine and the input shaft of the multi-stage transmission are connected to each other only through the torque converter, so that a torque shock generated at the time of the starting the vehicle or during shifting is absorbed by a slipping action of the torque converter.

However, the known transmitting system suffers from the following drawbacks: The torque converter or the fluid coupling has a slipping function, but performs the transmission of a torque to certain degree, as long as a power is input from the engine to the torque converter or the fluid coupling. Therefore, in the known system, at the time of starting the vehicle in which the transmission is switched over from a neutral position to a low or first-speed position, a creep phenomenon is produced in which power is transmitted to a driving wheel of the vehicle to certain degree, even if the engine is in an idling state. During traveling of the vehicle, the friction always occurs in switching and sliding portions of the transmission due to the transmitted torque. For this reason, there are inconveniences that the resistance to the switching of the transmission is large, and a large shifting load is required. In addition, the torque converter is mounted to the input shaft of the multi-stage transmission driven in a decelerated manner from the engine and for this reason, the transmitted torque borne by the torque converter is relatively large, and hence, a large-sized torque converter having a large capacity is obliged to be used. This makes it difficult to provide the compactness of the power unit including the engine and the transmission.

SUMMARY OF THE INVENTION

Accordingly, it is an object of the present invention to provide a transmitting system of the above-described type for a small-sized vehicle, wherein the creep phenomenon is eliminated; the shifting operation of the transmission can be carried out lightly; the compactness of the power unit can be obtained; and a lubricating oil for the engine can be utilized effectively to operate the fluid transmitting means.

To achieve the above object, according to the present invention, there is provided a transmitting system for a small-sized vehicle in which a crankshaft of an engine and an input shaft of a multi-stage transmission, which is disposed in parallel to the crankshaft, are connected to each other through a fluid transmitting means including a pump impeller leading to the engine, and a turbine impeller leading to the multi-stage transmission, wherein the transmitting system includes a shifting clutch, the fluid transmitting means and the shifting clutch being mounted on the crankshaft of the engine and connected in series to each other, one of the fluid transmitting means and the shifting clutch being connected to the crankshaft, and the other being connected to the input shaft of the multi-stage transmission through a primary reducing device; and the crankshaft is provided with an upstream supply oil passage connected to a discharge port in an oil pump, a downstream supply oil passage connected to portions to be lubricated around the crankshaft, a flow-in bore which permits the upstream supply oil passage to communicate with a fluid inlet in the fluid transmitting means, and a flow-out bore which permits a fluid outlet in the fluid transmitting means to communicate with the downstream supply oil passage.

The fluid transmitting means corresponds to a torque converter T in embodiments of the present invention which will be described hereinafter.

With the first feature, during idling of the engine, the transmitting of power to the shifting clutch and the like can be cut off by controlling the shifting clutch to its OFF state irrespective of the presence of the fluid transmitting means, even in a first-speed position of the transmission, thereby preventing the creep phenomenon. During shifting, the transmission can be brought into an unloaded state, by first controlling the shifting clutch to its OFF state irrespective of the presence of the fluid transmitting means, thereby conducting the shifting lightly without generation of a torque shock.

Moreover, the crankshaft is rotated at higher speed than that of the input shaft of the transmission driven through the reducing device. Therefore, the transmitted torque borne by the fluid transmitting means and the shifting clutch mounted on the crankshaft is relatively small, and the capacities of the fluid transmitting means and the shifting clutch can be reduced correspondingly, leading to the compactness of the fluid transmitting means and the shifting clutch. Therefore, the compactness of the power unit can be achieved, despite the disposition of both the fluid transmitting means and the shifting clutch.

Further, the oil discharged by the oil pump driven by the engine flows first into the upstream supply oil passage and then, via the flow-in bore into the fluid transmitting means to contribute to the operation and cooling of the fluid transmitting means. Further, oil is discharged through the flow-out bore into the downstream supply oil passage and then supplied to the portions to be lubricated around the crankshaft to contribute to their lubrication. In this way, the lubricating oil for the engine can be utilized to operate the fluid transmitting means and hence, it is unnecessary to mount an exclusive oil pump for supplying any operating oil to the fluid transmitting means.

According to a second aspect and feature of the present invention, in addition to the first feature, the crankshaft has an orifice provided therein to permit the direct communication between the upstream and downstream supply oil passages.

With the second feature, a portion of the oil supplied from the oil pump to the upstream supply oil passage is passed through the orifice directly to the downstream supply oil passage without via the fluid transmitting means and supplied to the portions to be lubricated around the crankshaft. Therefore, the proportion of distribution of the oil to the fluid transmitting means and the engine can be determined freely by selection of the orifice.

According to a third aspect and feature of the present invention, in addition to the first feature, the transmitting system further includes a partition wall provided between the flow-in bore and the flow-out bore for partitioning the upstream and downstream supply oil passages from each other.

With the third feature, the oil supplied from the oil pump to the upstream supply oil passage is obliged to be passed through the inside of the fluid transmitting means through the flow-in bore and the flow-out bore. Thus, even if the oil pump is of a relatively small capacity or displacement, it is possible to prevent the shortage of the operating oil for the fluid transmitting means, which is effective for the small-sized vehicle.

According to a fourth aspect and feature of the present invention, in addition to any one of the first, second and third features, the fluid transmitting means comprises a torque converter which is comprised of a pump impeller connected to an input side, a turbine impeller connected to an output side, and a stator impeller connected to a stationary structure through a free wheel, the stator impeller having a boss which is rotatably carried on the crankshaft; and a first small oil chamber is provided on one side of the boss to permit the flow-in bore to communicate with an oil chamber defined between the pump impeller and the turbine impeller, and a second small oil chamber is provided on the other side of the boss to permit the oil chamber defined between the pump impeller and the turbine impeller to communicate with the flow-out bore, the first and second small oil chambers being put into communication with each other.

The stationary structure corresponds to a crankcase 1 in embodiments of the present invention which will be described hereinafter.

With the fourth feature, when the pump impeller is to draw a large amount of oil into the torque converter by the rotation thereof, if the amount of oil discharged from the oil pump is small, and the amount of oil supplied from the upstream supply oil passage into the first small oil chamber is insufficient, then the oil flows from the second small oil chamber into the first small oil chamber to compensate for the insufficiency. Thus, the generation of air bubbles in the oil within the torque converter can be inhibited to prevent a reduction in transmitting efficiency.

According to a fifth aspect and feature of the present invention, in addition to the fourth feature, bearings are interposed between the crankshaft and the boss for permitting the communication between the first and second small oil chambers.

With the fifth feature, the stable rotation of the stator impeller can be ensured by the bearings and moreover, the bearings can be lubricated effectively by the oil flowing between the first and second small oil chambers.

BRIEF DESCRIPTION OF THE DRAWINGS

FIGS. 1 to 12 show a first embodiment of the present invention, wherein

FIG. 1 is a side view of a motorcycle to which the present invention is applied;

FIG. 2 is a vertical sectional view of a power unit mounted in the motorcycle;

FIG. 3 is an enlarged vertical sectional view of a transmitting system in the power unit;

FIG. 4 is a sectional view taken along a line 4—4 in FIG. 3;

FIG. 5 is a view taken along a line 5—5 in FIG. 3;

FIG. 6 is a side view of the transmitting system;

FIG. 7 is an enlarged view showing an outlet valve in a shifting clutch in a closed state in FIG. 3;

FIG. 8 is an enlarged view showing the outlet valve in an opened state;

FIG. 9 is a sectional view taken along a line 9—9 in FIG. 3;

FIG. 10 is a sectional view taken along a line 10—10 in FIG. 3;

FIG. 11 is an enlarged view showing a control valve in a lock-up clutch in a closed state in FIG. 3;

FIG. 12 is an enlarged view showing the control valve in an opened state;

FIGS. 15 to 17 show a fourth embodiment of the present invention, wherein

FIG. 15 is a side view of a four-wheel buggy to which the present invention is applied;

FIG. 16 is a plan view of the four-wheel buggy, taken vertically through the power unit; and FIG. 17 is an enlarged vertical sectional view of a transmitting system for the power unit.

DESCRIPTION OF THE PREFERRED EMBODIMENTS

A first embodiment of the present invention will first be described with reference to FIGS. 1 to 12.

Figure 1:
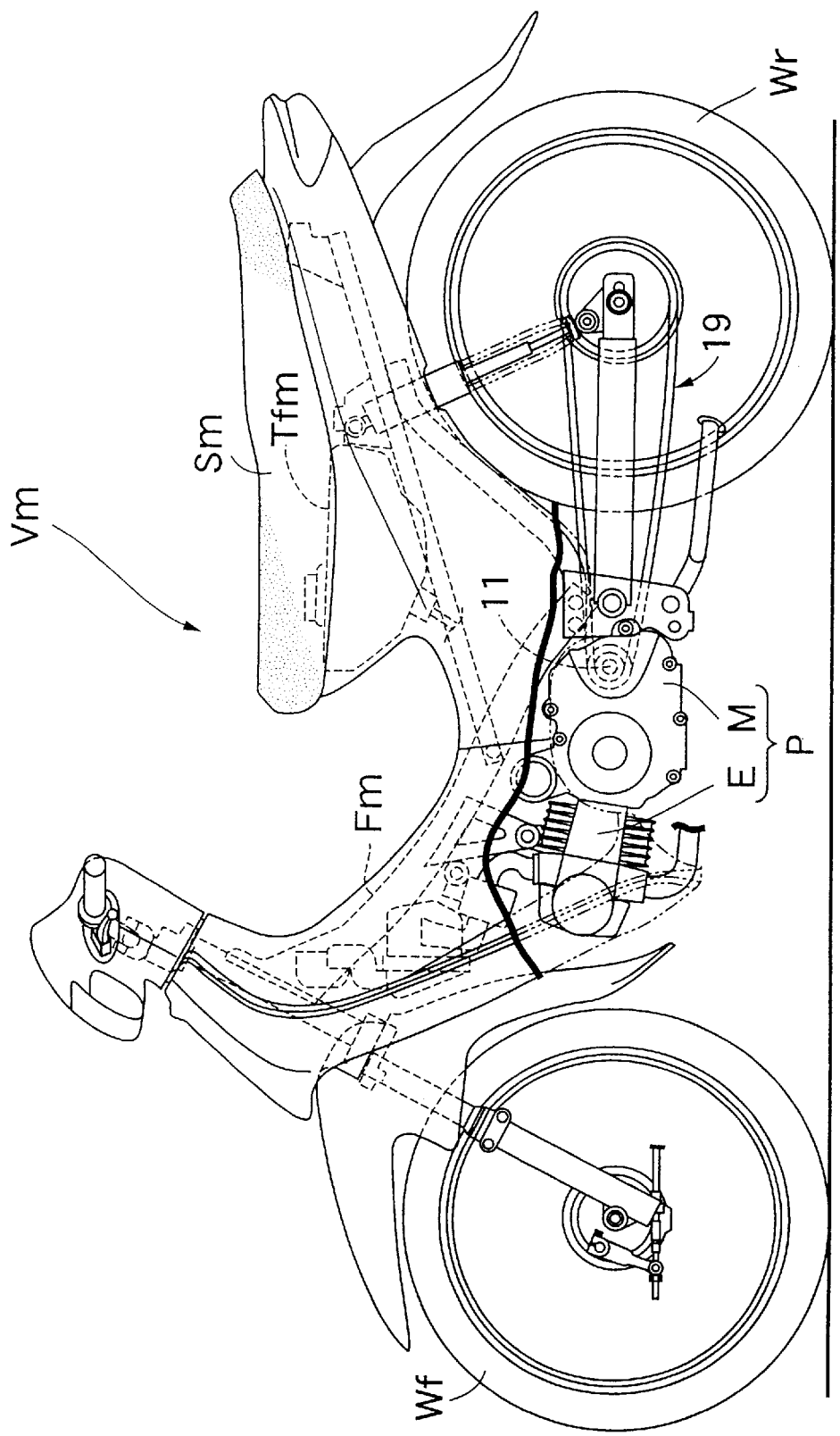
Figure 2:
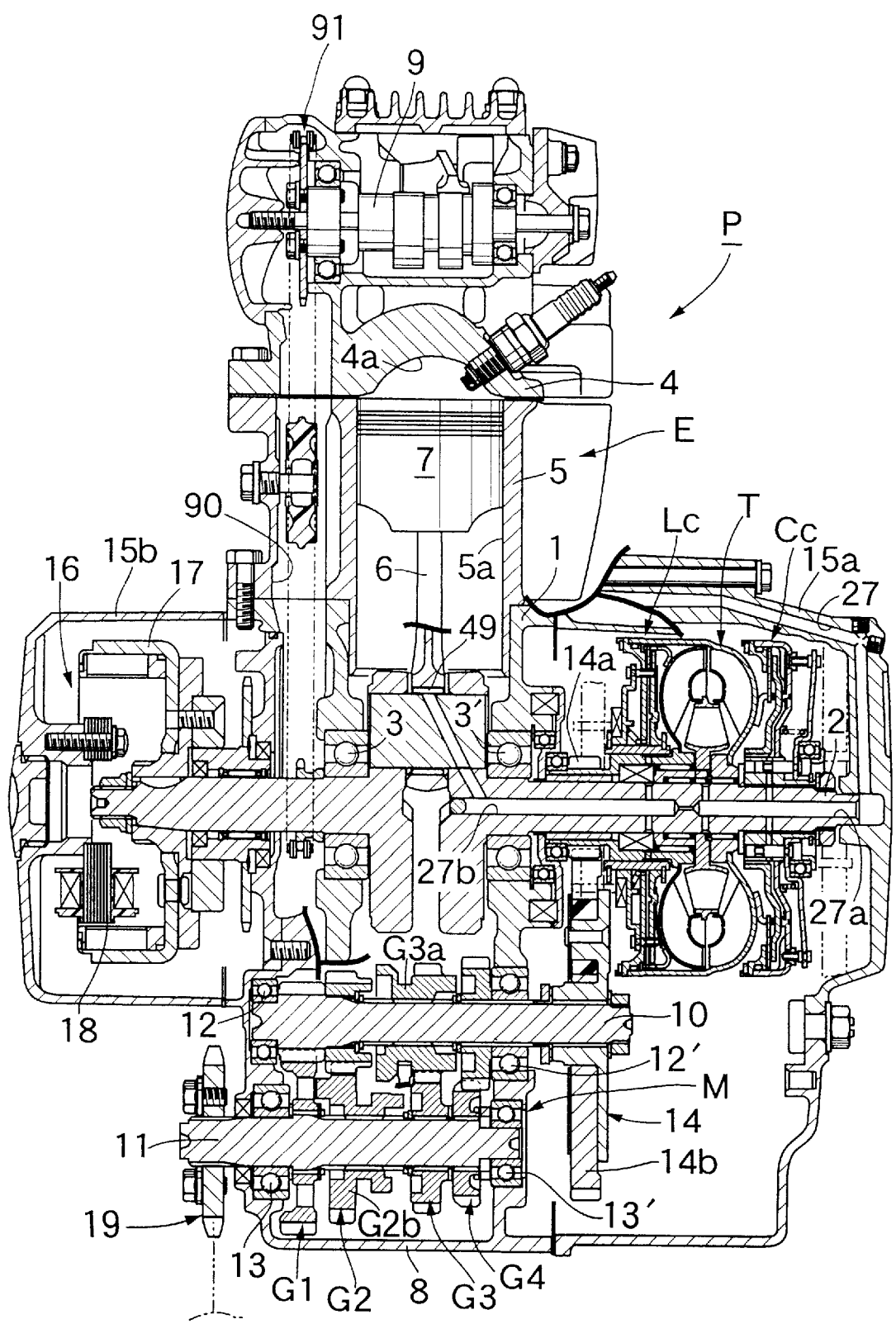

Referring to FIG. 1, a saddle Sm is mounted on a motorcycle Vm at an upper portion of a body frame Fm supporting a front wheel Wf and a rear wheel Wr, and a power unit P is mounted at a lower portion of the body frame Sm. A fuel tank Tfm is disposed As shown in FIGS. 1 and 2, the power unit P is comprised of an engine E and a multi-stage transmission M which are formed integrally each other. The engine E includes, as conventionally normal, a crankshaft 2 carried in a crankcase 1 with a pair of left and right ball bearings 3 and 3' interposed therebetween, and a piston 7 slidably received in a cylinder bore 5a in a cylinder block 5 and connected to the crankshaft 2 through a connecting rod 6. The engine E is disposed with the crankshaft 2 turned in a lateral direction of the motorcycle Vm. A cylinder head 4 is coupled to the cylinder block 5 to define a combustion chamber 4a between the cylinder head 4 and a top surface of the piston 7. Provided in the cylinder head 4 are intake and exhaust valves (not shown) for opening and closing intake and exhaust bores connected to the combustion chamber 4a, and a cam shaft 9 adapted to open and close the intake and exhaust valves. The cam shaft 9 is rotatably carried in the cylinder head 4 in parallel to the crankshaft 2.

A transmission case 8 is integrally connected to the crankcase 1, and input and output shafts 10 and 11 of the multi-stage transmission M, which are disposed in parallel to the crankshaft 2, are supported by opposite left and right sidewalls of the transmission case 8 with ball bearings 12 and 12'; 13 and 13' interposed therebetween, respectively. A first-speed gear train G1, a second-speed gear train G2, a third-speed gear train G3 and a fourth-speed gear train G4 are disposed in the named order from the left as viewed in FIG. 2 over the input and output shafts 10 and 11. A driven gear G2b in the second-speed gear train G2 and a driving gear G3a in the third-speed gear train G3 also serve as shifting gears. When both of the shifting gears G2b and G3a are in their neutral positions, the transmission M is in a neutral state. When the shifting gear G2b is moved leftwards or rightwards as viewed in FIG. 2, the first-speed gear train G1 or the third-speed gear train G3 is established. When the shifting gear G3a is moved leftwards or rightwards as viewed, the second-speed gear train G2 or the fourth-speed gear train G4 is established. The shifting gears G2b and G3a are operated by a known pedal-type changing device or another manual changing device which is not shown.

A right end of the crankshaft 2 and a right end of the input shaft 10 of the transmission M are connected to each other through a shifting clutch Cc, a torque converter T and a primary reducing device 14 which are connected together in series outside the crankcase 1 and the transmission case 8. In this case, especially, the shifting clutch Cc, the torque converter T and a driving gear 14a of the primary reducing device 14 are mounted on the crankshaft 2 in the order of the driving gear 14a, the torque converter T and the shifting clutch Cc from the right sidewall of the crankcase 1 toward the outside. A right side cover 15a, which covers the shifting clutch Cc, the torque converter T and the driving gear 14a, is bonded to right end faces of the crankcase 1 and the transmission case 8.

A rotor 17 of a generator 16 is secured to a left end of the crankshaft 2, and a stator 18 of the generator 16 is mounted to a left side cover 15b which is bonded to a left end face of the crankshaft 1 to cover the generator 16. A continuous timing transmitting chamber 90 is defined in those left sidewalls of the crankcase 1 and the cylinder block 5, which are opposite to the torque converter T and the primary reducing device 14. A timing transmitting device 91 for transmitting the rotation of the crankshaft 2 through a reduction to one half to the cam shaft 9 is accommodated in the transmitting chamber 90. Thus, a group of the primary reducing device 14, the torque converter T and the shifting clutch Cc and a group of the timing transmitting device 91 and the generator 16 are disposed at opposite ends of the crankshaft 2 in such a manner that the inside of the crankcase 1, i.e., a crank chamber, is sandwiched therebetween.

Figure 3:
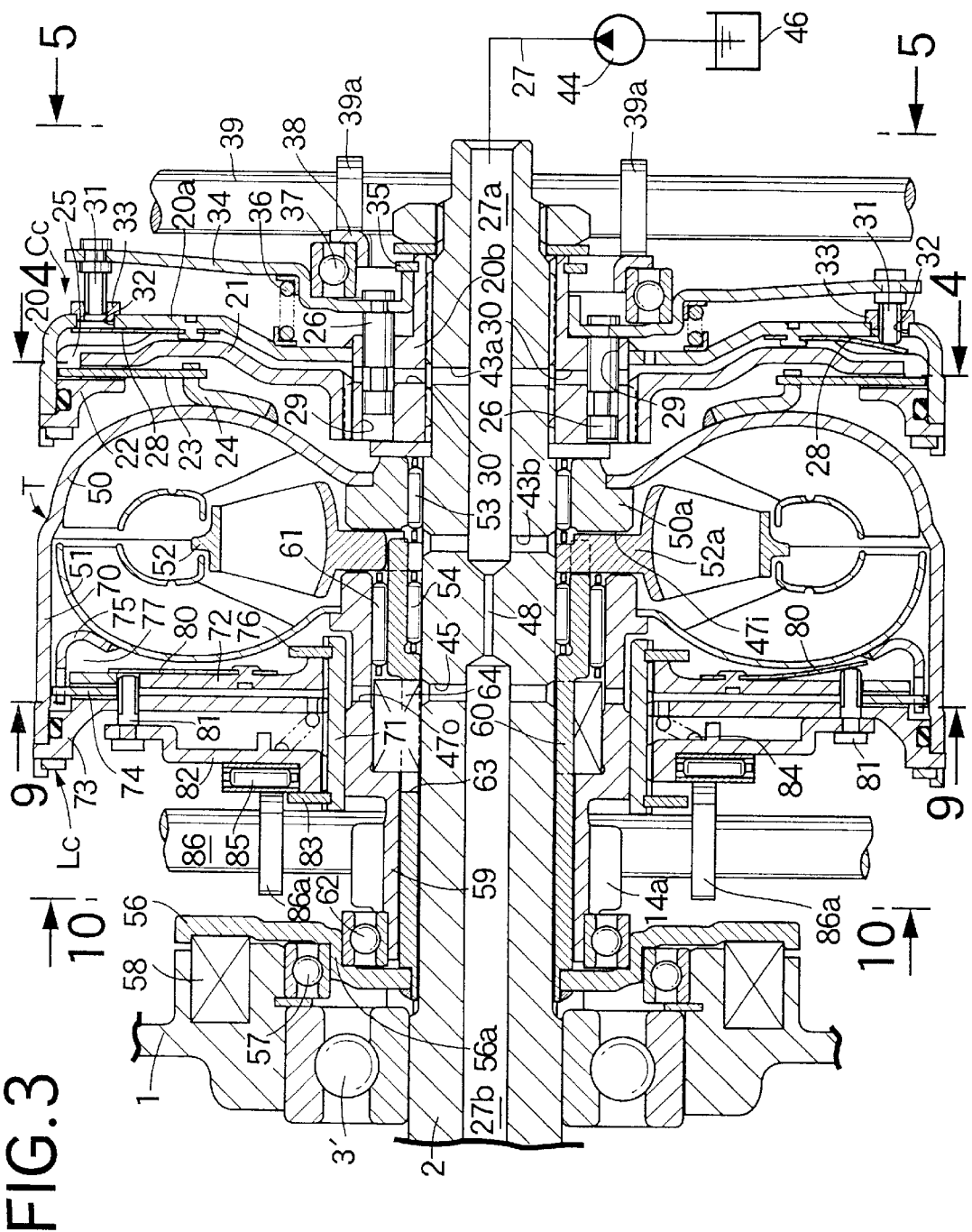

As shown in FIGS. 2 and 3, provided in the crankshaft 2 are an upstream supply oil passage 27a which opens into a right end face of the crankshaft 2, a downstream supply oil passage 27b which communicates with a needle bearing 49 on an outer peripheral surface of a crank pin supporting a larger end of the connecting rod 6, an orifice 48 which communicates directly with both the oil passages 27a and 27b, a first flow-in bore 43a extending radially from the upstream supply oil passage 27a toward the shifting clutch Cc, a second flow-in bore 43b extending radially from the upstream supply oil passage 27a toward the torque converter T, and a flow-out bore 45 extending radially from the downstream supply oil passage 27b toward the torque converter T. An oil pumped from an oil reservoir 46 by an oil pump 44 driven by the engine E is fed under a pressure through an oil passage 27 defined in the right side cover 15a to the upstream supply oil passage 27a. The oil reservoir 46 is defined in bottoms of the crankcase 1, the transmission case 8 and the right side cover 15a.

A chain-type final reducing device 19 which drives the rear wheel (not shown) of the motorcycle is connected to a left end of the output shaft 11 of the transmission M outside the transmission case 8.

Referring to FIGS. 2 and 3, the shifting clutch Cc includes a cylindrical clutch casing 20 having an end wall 20a at its one end and a boss 20b spline-coupled to the crankshaft 2 at its central portion, a pressing plate 21 disposed within the clutch casing 20 and slidably spline-coupled to an outer periphery of the boss 20b, a pressure receiving plate 22 oil-tightly secured to an opened end of the clutch casing 20, and an annular friction clutch plate 23 interposed between the pressing plate 21 and the pressure receiving plate 22. A transmitting plate 24 of a pump impeller 50, which will be described hereinafter, is spline-engaged with an inner periphery of the friction clutch plate 23 (see FIG. 4).

The pressing plate 21 defines a hydraulic pressure chamber 25 between the pressing plate 21 and an end wall 20a and a peripheral wall of the clutch casing 20. The hydraulic pressure chamber 25 is connected to the first flow-in bore 43a in the crankshaft 2 through an inlet valve 26 provided on the boss 20b of the clutch casing 20, and opens to the outside of the clutch casing 20 through an outlet valve 28 provided on an outer periphery of the end wall 20a.

Figure 4:
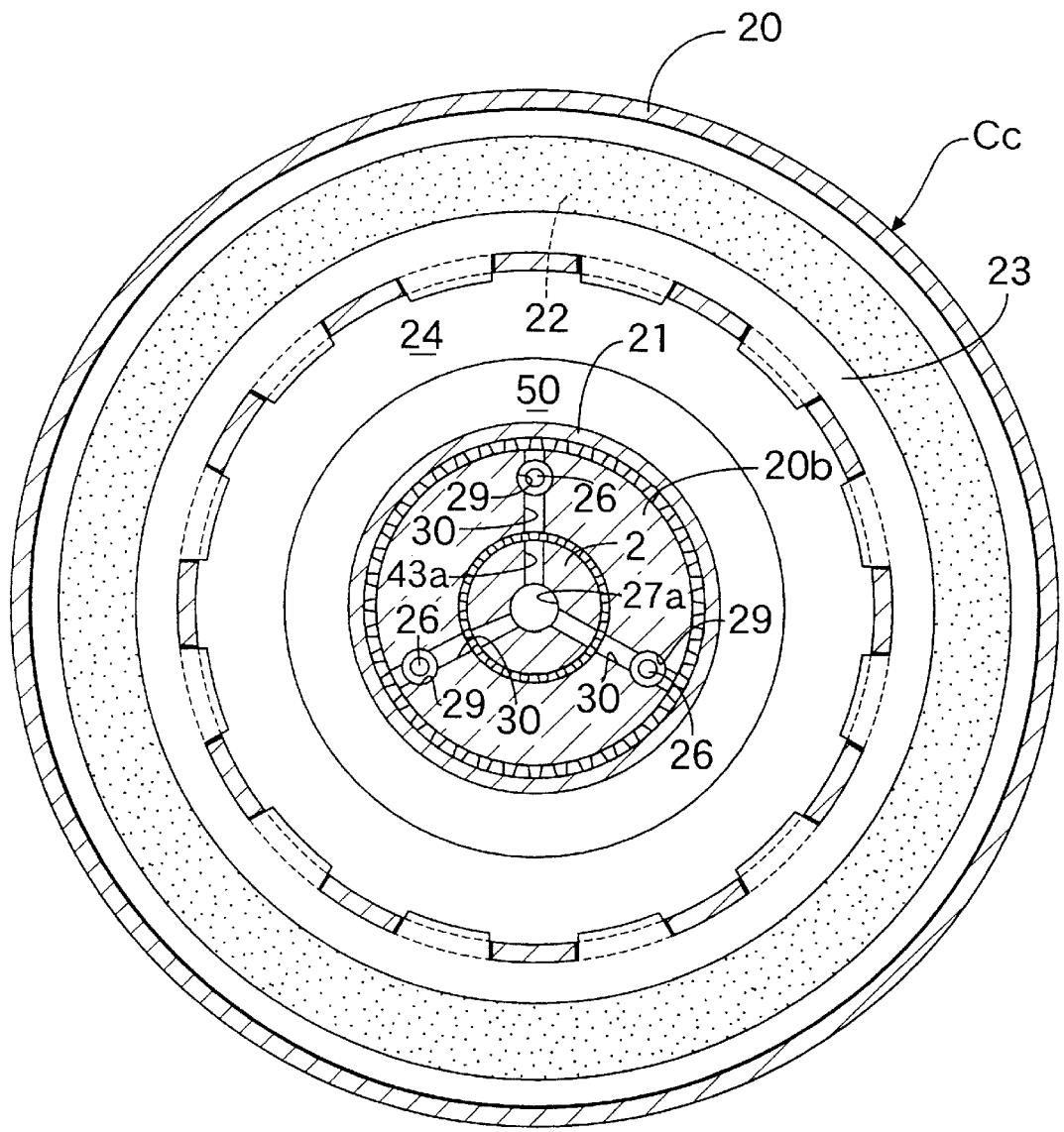

As shown in FIGS. 3 and 4, provided in the boss 20b are a plurality of (three in the illustrated embodiment) valve bores 29 extending in parallel to the crankshaft 2, and a plurality of through-bores 30 each extending via each of the valve bores 29 through the first flow-in bore 43a to the hydraulic pressure chamber 25. The inlet valve 26 comprising a spool valve is slidably received in each of the valve bore 29. When the inlet valves 26 occupy their right positions as viewed in FIG. 3 (upper half as viewed in FIG. 3), the through-bores 30 are opened, and when the inlet valves 26 occupy their left positions (lower half as viewed in FIG. 3), the through-bores 30 are closed. To ensure the communication between the through-bores 30 in the boss 20b and the first flow-in bore 43a in the crankshaft 2, it is effective to cut off some of teeth in the coupled spline portions of the crankshaft 2 and the boss 20b.

A plurality of (three in the illustrated embodiment) outlet bores 32 are provided in an outer periphery of the end wall 20a of the clutch casing 20 at equal distances in a circumferential direction, and the outlet valve 28 comprising a reed valve is coupled at its one end by caulking to the end wall 20a and capable of opening and closing each of the outlet bores 32 on the side of the hydraulic pressure chamber 25.

Further, guide collars 33 are secured to the end wall 20a and communicates with the outlet bores 32, and a valve opening rod 31 is slidably received in each of the guide collars 33. The valve opening rod 31 has an axially extending groove 31a around an outer periphery thereof. When the valve opening rod 31 occupies a right position as viewed in FIG. 3 (see the upper half as viewed in FIG. 3, and see FIG. 7), the closing of the outlet bore 32 by a resilient force of the outlet valve 28 is permitted. When the valve opening rod 31 occupies a left position as viewed in FIG. 3 (see the lower half as viewed in FIG. 3, and see FIG. 8), the outlet valve 28 is flexed inwards of the hydraulic pressure chamber 25 to open the outlet bore 32.

A common valve operating plate 34 is connected to outer ends of the inlet valves 26 and the valve opening rods 31. The valve operating rod 34 is carried on the boss 20b of the clutch casing 20 for sliding movement in a lateral direction as viewed in FIG. 3. A stopper ring 35 for defining the right position of the valve operating plate 34 is locked to the boss 20b, and a return spring 36 for biasing the valve operating plate 34 toward the stopper ring 35 is mounted under compression between the clutch casing 20 and the valve operating plate 34.

An urging ring 38 is mounted on the valve operating plate 34 with a release bearing 37 interposed therebetween and concentrically surrounding the boss 20b, and an arm 39a fixedly mounted on a shifting clutch operating shaft 39 is engaged with an outer end face of the urging ring 38. Thus, the valve operating plate 34 can be moved leftwards and rightwards along with the inlet valves 26 and the valve operating rods 31 in cooperation with the return spring 36 by reciprocally turning the shifting clutch operating shaft 39.

Figure 6:
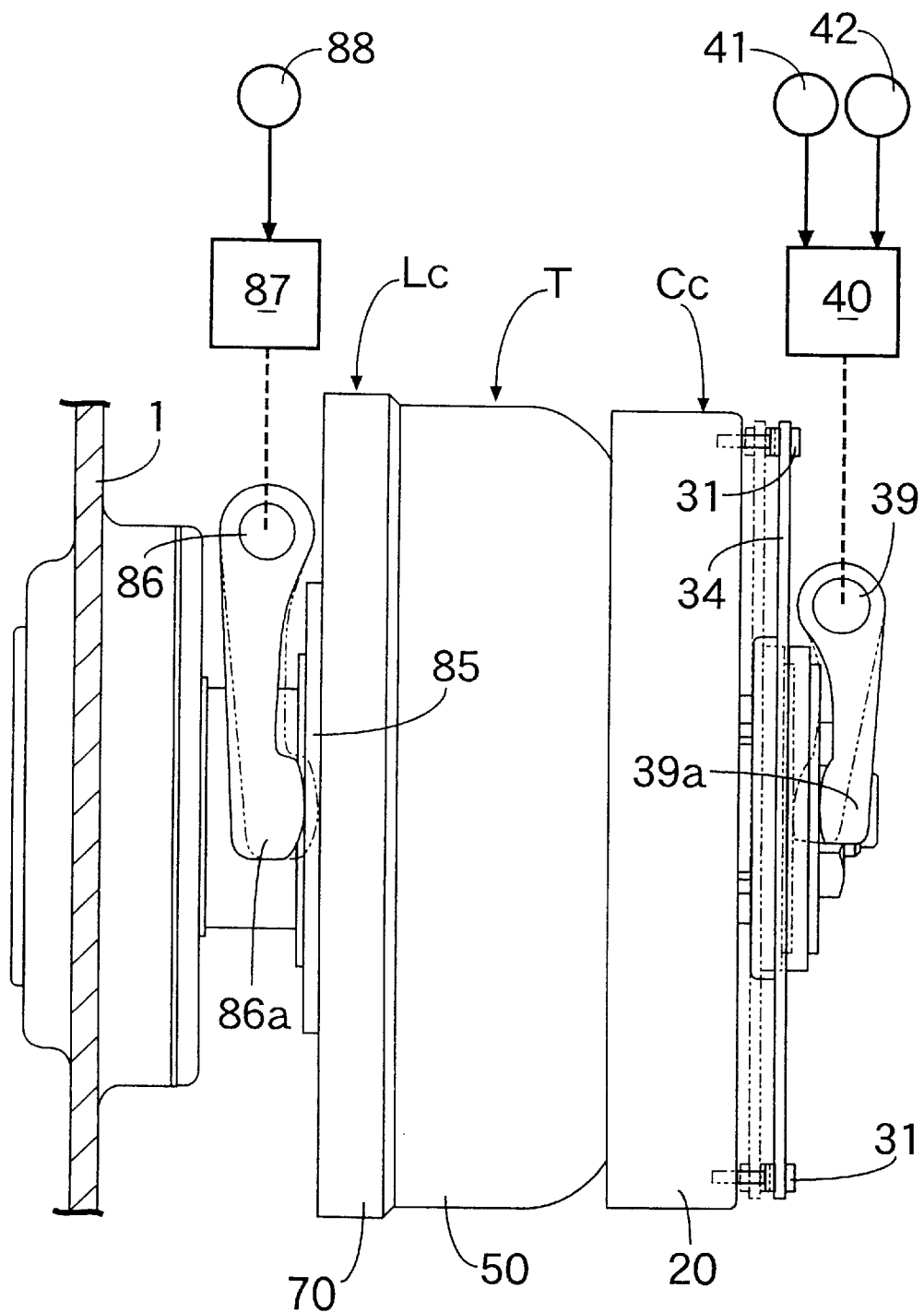
Figure 7:
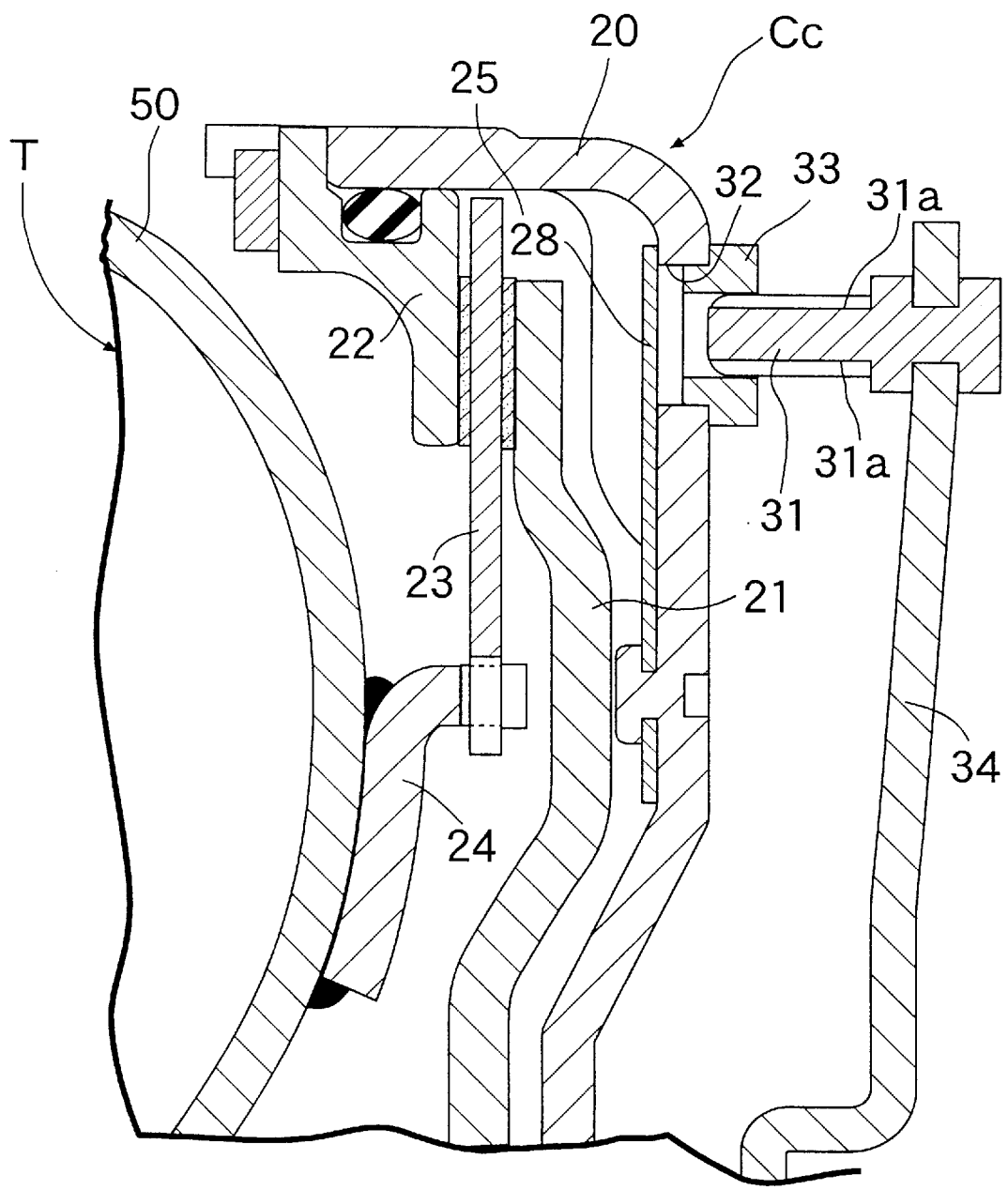
Figure 8:
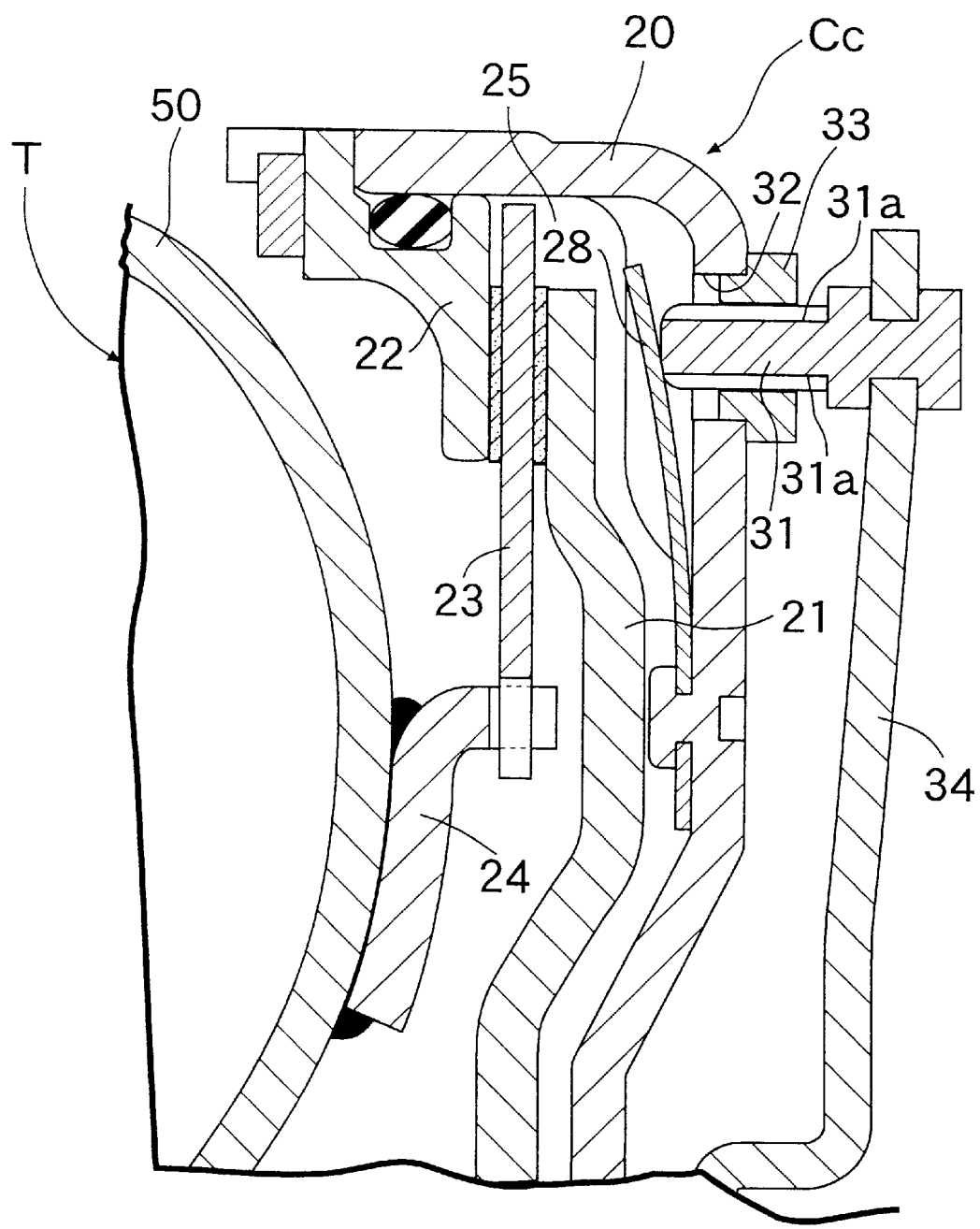
Figure 9:
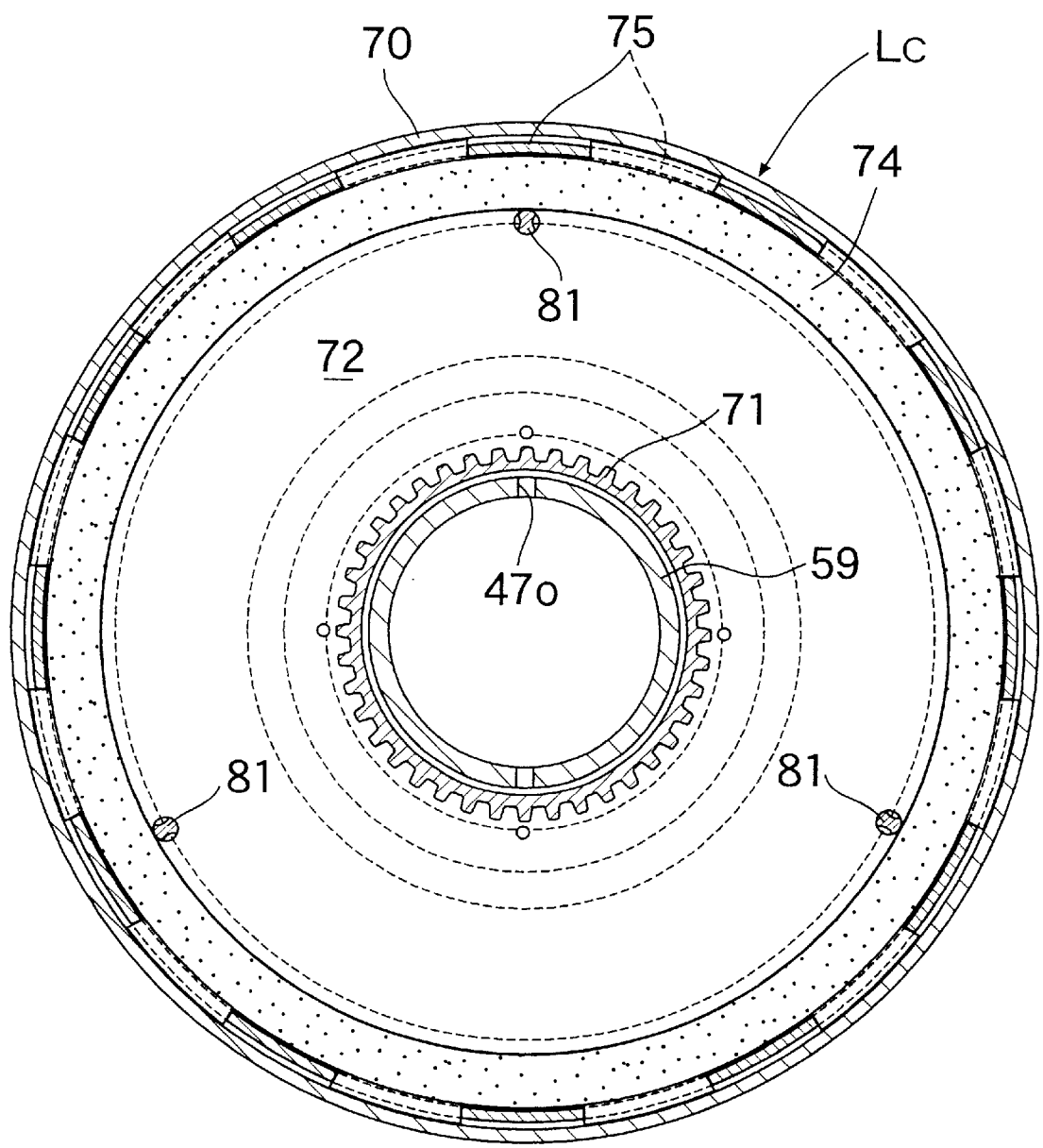
Figure 10:
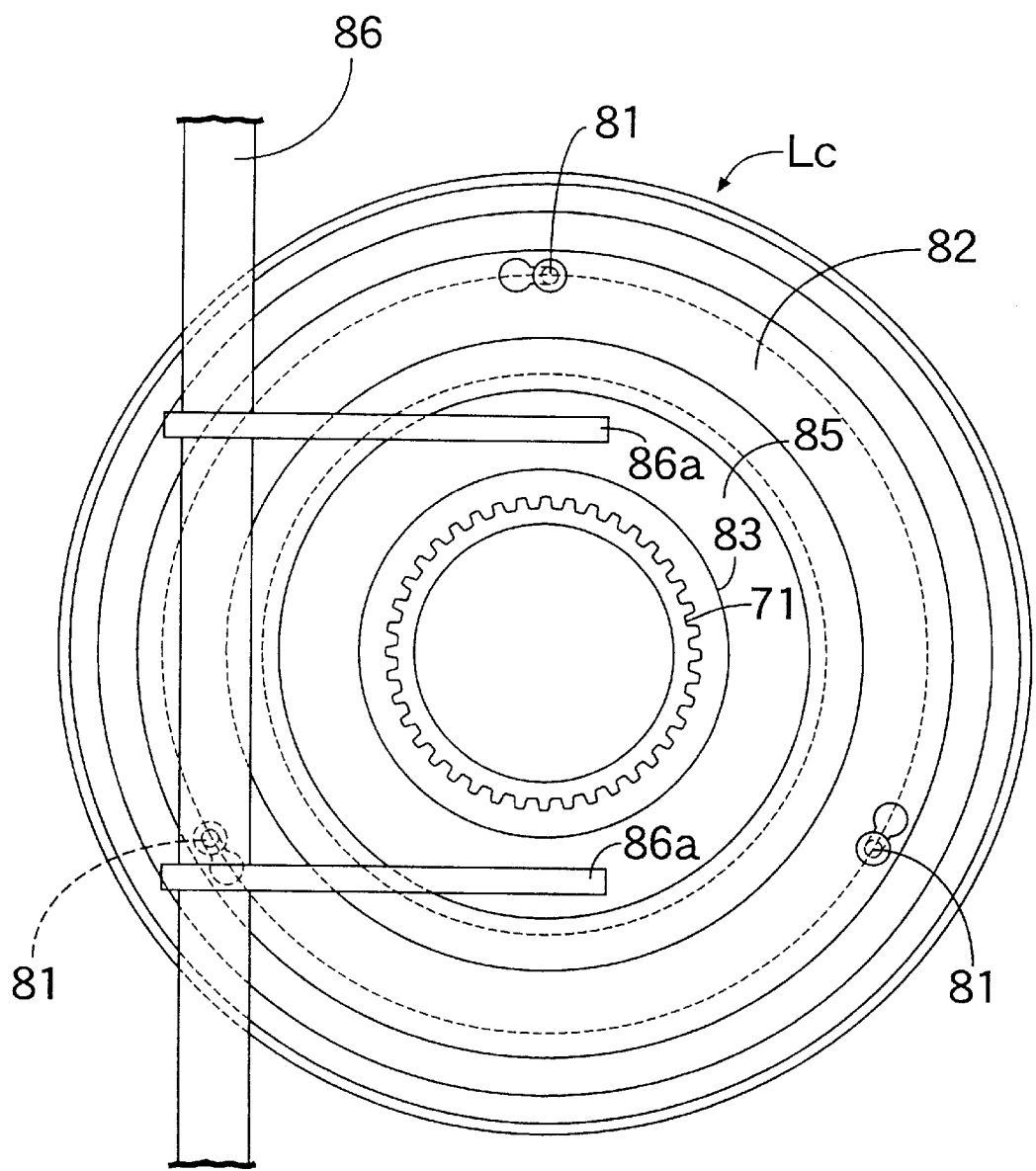

An electric or electromagnetic shifting clutch actuator 40 is connected to the shifting clutch operating shaft 39 for turning the shifting clutch operating shaft 39, as shown in FIG. 6. The shifting clutch actuator 40 receives output signals from an idling sensor 41 for detecting an idling state of the engine E and a shifting sensor 42 for detecting the shifting operation of the transmission M, and moves in response to these signals to turn the shifting clutch operating shaft 39 in a direction to move the valve operating plate 34 leftwards as viewed in FIG. 3.

The operation of the shifting clutch Cc will be described below. When the engine E is in operation and the idling sensor 41 and the shifting sensor 42 transmit no output signals, the shifting clutch actuator 40 is retained in an inoperative state and hence, the valve operating plate 34 is retained in its retracted position, i.e., in the right position as viewed in FIG. 3 by a biasing force of the return spring 36, thereby opening the inlet valves 26 and permitting the closing of the outlet valves 28. Therefore, the oil pumped from the oil pump 44 is supplied from the upstream supply oil passage 27a via the first inlet bore 43a and the through bores 30 to the hydraulic pressure chamber 25 in the clutch casing 20 to fill the hydraulic pressure chamber 25.

The clutch casing 20 is rotated along with the crankshaft 2 and hence, the oil in the hydraulic pressure chamber 25 in the clutch casing 20 receives a centrifugal force to generate a hydraulic pressure, and the pressing plate 21 urges the friction clutch plate 23 against the pressure receiving plate 22 by such hydraulic pressure, whereby the pressing plate 21, the pressure receiving plate 22 and the friction clutch plate 23 are brought into friction engagement with one another. Namely, the shifting clutch Cc assumes an ON-state to transmit a torque out from the crankshaft 2 through the friction clutch plate 23 to the torque converter T.

On the other hand, during an idling of the engine E or during a shifting operation of the transmission M, the idling sensor 41 or the shifting sensor 42 outputs the output signal, and hence, the shifting clutch actuator 40 receiving the output signal is operated immediately to turn the shifting clutch operating shaft 39 to move the valve operating plate 34 to the left position as viewed in FIG. 3. This closes the inlet valves 26 and at the same time, opens the outlet valves 28, as shown in the lower half of FIG. 3. As a result, the supplying of the oil from the upstream supply oil passage 27a to the hydraulic pressure chamber 25 is cut off, and the oil in the hydraulic pressure chamber 25 is passed through the outlet bores 32 and the grooves 31a in the valve operating rods 31 and discharged to the outside of the clutch casing 20 to drop the hydraulic pressure in the hydraulic pressure chamber 25 and to remarkably decrease the urging force of the pressing plate 21 to the friction clutch plate 23. Therefore, the friction engagement of the three plates: the pressing plate 21, the pressure receiving plate 22 and the friction clutch plate 23 is released. Namely, the shifting clutch Cc assumes an OFF state to cut off the transmitting of the torque from the crankshaft 2 to the torque converter T. The oil discharged to the outside of the clutch casing 20 is returned to the oil reservoir 46.

When the rotation of the engine E is accelerated to start the vehicle from such state, or the shifting operation is completed, thereby stopping of the output signals of both the idling sensor 41 and the shifting sensor 42, the shifting clutch actuator 40 is immediately returned to its inoperative state, and the valve operating plate 34 is retreated at a stretch to the right position by the biasing force of the return spring 36, thereby again opening the inlet valves 26 and at the same time, closing the outlet valves 28. Therefore, as can be seen from the above-described operation, the shifting clutch Cc is restored from the OFF state to the ON state without via a half-clutched state or a clutch-slipping state. Namely, the shifting clutch Cc is of an ON and OFF type having no half-clutched area and has a torque capacity which is set larger than that of the torque converter T.

Referring again to FIG. 3, the torque converter T comprises a pump impeller 50, a turbine impeller 51 and a stator impeller 52. The pump impeller 50 is disposed adjacent the pressure receiving plate 22, and has a boss 50a which is carried on the crankshaft 2 with a needle bearing 53 interposed therebetween. The transmitting plate 24 spline-engaged with the inner periphery of the friction clutch plate 23 is secured to an outer surface of the pump impeller 50. Therefore, a transmitted torque from the friction clutch plate 23 is transmitted through the transmitting plate 24 to the pump impeller 50.

A stator shaft 60 is disposed between the boss 50a of the pump impeller 50 and the ball bearing 3' carrying the crankshaft 2, and is carried at its right end on the crankshaft 2 with a needle bearing 54 interposed therebetween. A boss 52a of the stator impeller 52 is connected to the stator shaft 60 by concavo-convex engagement. A stator arm 56 is secured to a left end of the stator shaft 60, with an outer peripheral surface of a cylindrical portion 56a possessed at an intermediate portion by the stator arm plate 56 being carried on the crankcase 1 with a ball bearing 57 interposed therebetween. An outer periphery of the stator arm plate 56 is also carried on the crankcase 1 with free wheel 58 interposed therebetween.

The turbine impeller 51 opposed to the pump impeller 50 has a turbine shaft 59 integrally provided at its center portion, and carried at its right end on the stator shaft 60 with a needle bearing 61 interposed therebetween. The turbine shaft 59 is carried at its left end on an inner peripheral surface of the cylindrical portion 56a of the stator arm plate 56 with a ball bearing 62 interposed therebetween. A oneway clutch 64 is provided between the turbine shaft 59 and the crankshaft 2 to extend through a lateral bore 63 in the stator shaft 60. When a reverse load is applied to the turbine shaft 59, the oneway clutch 64 is brought into an ON state to directly connect the turbine shaft 59 and the crankshaft 2 to each other.

As shown in FIG. 3, a clearance defined between the boss 50a of the pump impeller 50, the turbine shaft 59 and the boss 52a of the stator impeller 52 serves as a fluid inlet 47i in the torque converter T, and a fluid outlet 47o in the torque converter T is provided at that portion of the turbine shaft 59 which extends out of the turbine impeller 51. The fluid inlet 47i is communicates with the second flow-in bore 43b in the crankshaft 2, and the fluid outlet 47o communicates with the flow-out bore 45 in the crankshaft 2 through the lateral bore 63 in the stator shaft 60. Therefore, when the oil supplied from the oil pump 44 to the upstream supply oil passage 27a in the crankshaft 2 enters the second flow-in bore 43b, it flows through the fluid inlet 47 into an oil chamber defined between the pump impeller 50 and the turbine impeller 51 to fill the oil chamber and a hydraulic pressure chamber 77 in a lock-up clutch Lc which will be described hereinafter, and then flows through the fluid outlet 47o via the flow-out bore 45 toward the downstream supply oil passage 27b in the crankshaft 2.

The driving gear 14a of the primary reducing device 14 is integrally formed on the turbine shaft 59, and the driven gear 14b meshed with the driving gear 14a is spline-coupled to the input shaft 10 of the transmission M. The primary reducing device 14 constructed in the above manner is disposed between the crankcase 1 and the torque converter T.

The operation of the torque converter T will be described below.

When the output torque from the crankshaft 2 is transmitted through the shifting clutch Cc which is in the ON state to the pump impeller 50, it is transmitted fluidally to the turbine impeller 51 by the action of the oil filling the inside of the torque converter T. If a torque amplifying effect has been generated between both the impellers 50 and 51 at this time, a reaction force attendant thereon is borne by the stator impeller 52, and the stator impeller 52 is fixedly supported on the crankcase 1 by the locking action of the free wheel 58. If no torque amplifying effect is generated, the stator impeller 52 can be raced by a racing action of the free wheel 58 and hence, the three impellers: the pump impeller 50, the turbine impeller 51 and the stator impeller 52 are all rotated in the same direction.

The torque transmitted from the pump impeller 50 to the turbine impeller 51 is transmitted through the primary reducing device 14 to the input shaft 10 of the transmission M and then transmitted sequentially via the established shifting gear trains G1 to G4, the output shaft 11 and the finally reducing device 19 to the rear wheel (not shown) to drive the rear wheel.

During conduction of an engine brake during traveling of the vehicle, the one-way clutch 64 is brought into the ON state by application of the reverse load torque to the turbine shaft 59. Therefore, the turbine shaft 59 and the crankshaft 2 are connected directly to each other, whereby the reverse load torque is transmitted to the crankshaft 2 without via the torque converter T. Thus, it is possible to provide a good engine brake effect.

Referring again to FIG. 3, a lock-up clutch Lc is provided between the pump impeller 50 and the turbine impeller 51 and capable of directly connecting the pump impeller 50 and the turbine impeller 51 to each other. The lock-up clutch Lc includes a cylindrical pump extension 70 which is connected to the outer periphery of the pump impeller 50 to surround the turbine impeller 51, a pressing plate 72 which is slidably spline-fitted over a support tube 71 rotatably carried on the outer peripheral surface of the turbine shaft 59, a pressure receiving plate 73 which is oil-tightly secured to an end of the pump extension 70 in an opposed relation to the pressing plate 72 and which is spline-fitted over the support tube 71, and a annular friction clutch plate 74 interposed between the pressing plate 72 and the pressure receiving plate 73. The friction clutch plate 74 has an outer periphery spline-engaged with a transmitting plate 75 secured to the outer surface of the turbine impeller 51 (see FIG. 9). The retreated position of the pressing plate 72 to the pressure receiving plate 73 is defined by a stopper ring 76 locked to the support tube 71.

A hydraulic pressure chamber 77 is defined in the inside of the pump extension 70 by the pressure receiving plate 73, and communicates with the insides of the pump impeller 50 and the turbine impeller 51 through opposed clearances between the pump impeller 50 and the turbine impeller 51. When the oil is filled in the hydraulic pressure chamber 77, during the operation of the torque converter T, the hydraulic pressure chamber 77 is at a high pressure, as are the insides of the pump impeller 50 and the turbine impeller 51.

Figure 11:
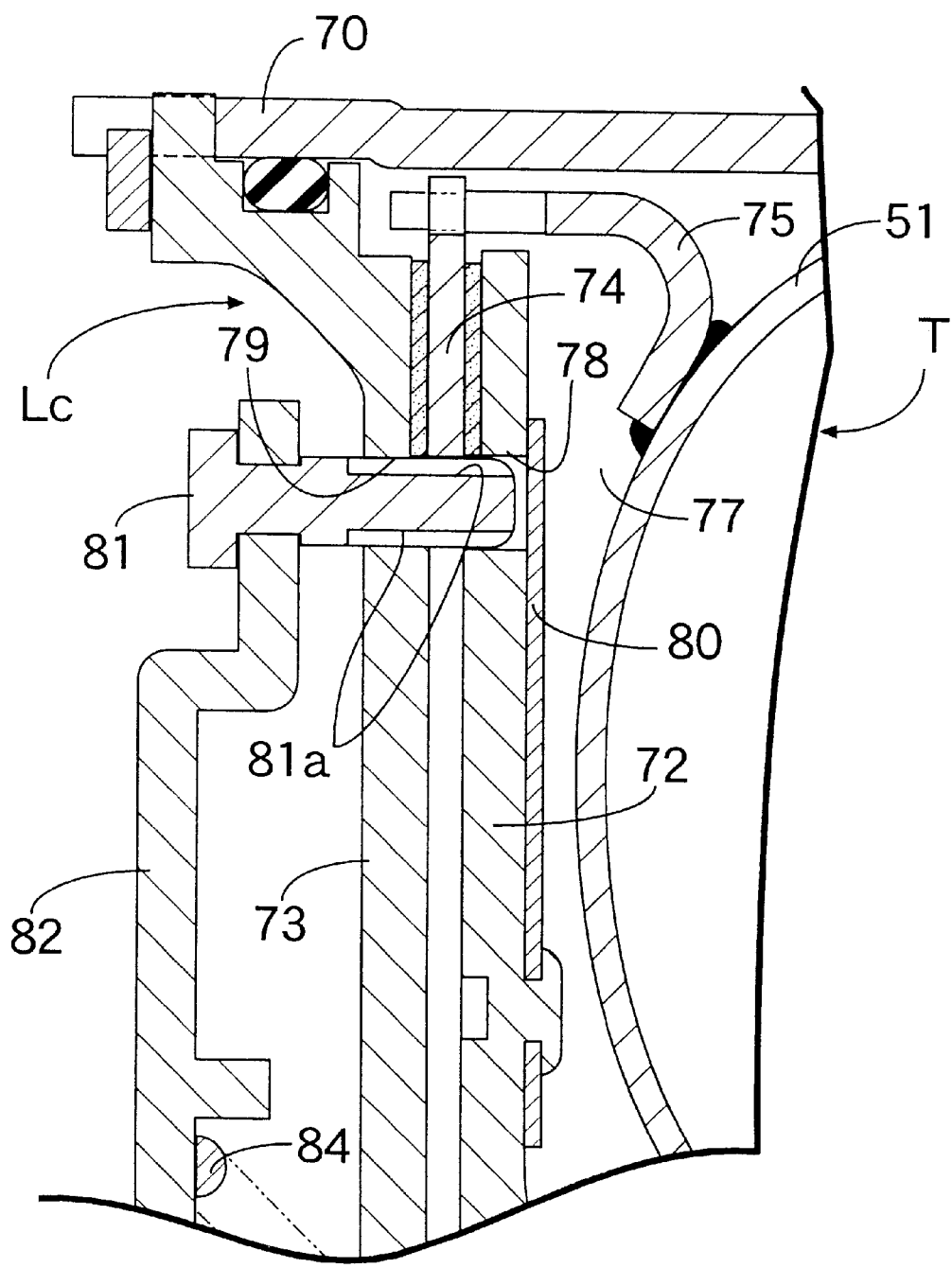
Figure 12:
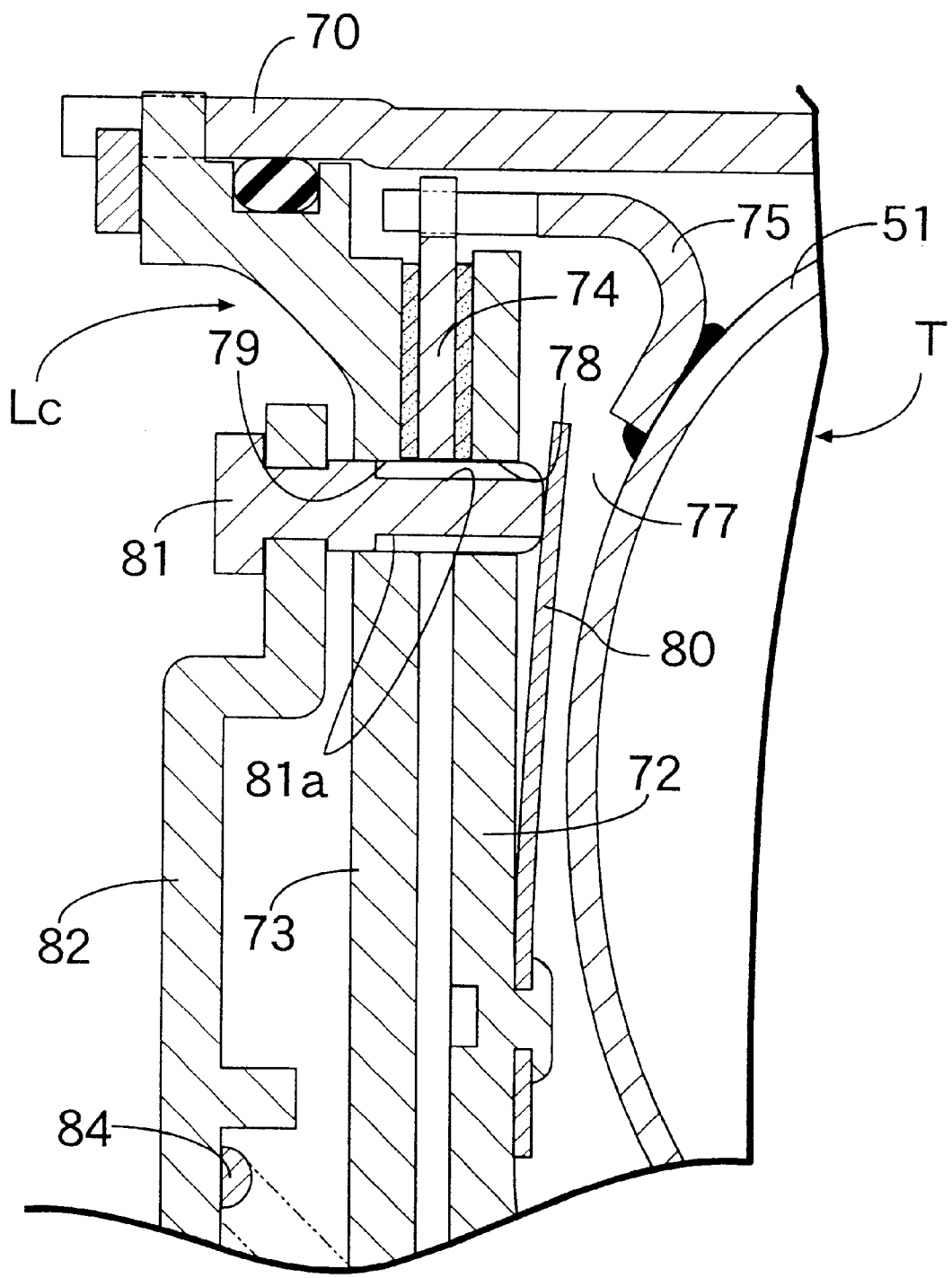

As shown in FIGS. 3, 11 and 12, a plurality of (three in the illustrated embodiment) valve bores 78, 79 are provided in each of the pressing plate 72 and the pressure receiving plate 73 at circumferentially equal distances on the side of the inner periphery of the friction clutch plate 74, and a control valve 80 comprising a reed valve capable of opening and closing the valve bores 78 in the pressing plate 72 on the side of the hydraulic pressure chamber 77 is coupled at its one end to the pressing plate 72 by caulking.

The valve bores 78 and 79 in the pressing plate 72 and the pressure receiving plate 73 are disposed coaxially with each other, and a control rod 81 for controlling the opening and closing of the control valve 80 is slidably received in the valve bores 78 and 79. The control rod 81 has an axially extending communication groove 81a in its outer periphery. When the control rod 81 occupies a left position as viewed in FIG. 3 (see upper half of FIG. 3 and see FIG. 11), the closing of the valve bore 78 by the resilient force of the control valve 80 is permitted, and at the same time, the inner periphery of the friction clutch plate 74 is opened to the outside of the valve bore 79 in the pressure receiving plate 73 by the communication groove 81a in the control rod 81. When the control rod 81 occupies a right position as viewed in FIG. 3 (see lower half of FIG. 3 and see FIG. 12), the valve bore 79 in the pressure receiving plate 73 is closed by the control rod 81, and at the same time, the control valve 80 is flexed inwards of the hydraulic pressure chamber 77, thereby permitting opposite side faces of the pressing plate 72 to communicate with each other through the communication groove 81a on the side of the inner periphery of the friction clutch plate 74.

A valve operating plate 82 is connected to an outer end of the control rod 81. The valve operating plate 82 is carried on the support tube 71 for sliding movement in a lateral direction as viewed in FIG. 3. A stopper ring 83 for defining a left position of the valve operating plate 82 is locked to the support tube 71, and a return spring 84 for biasing the valve operating plate 82 toward the stopper ring 83 is mounted under compression between the pressure receiving plate 73 and the valve operating plate 82.

An arm 86a of a lock-up clutch operating shaft 86 (an operating means) is engaged with the valve operating plate 82 through a release bearing 85 which is disposed concentrically with the support tube 71, so that the valve operating plate 82 can be moved laterally along with the control rod 81 in cooperation with the return spring 84 by reciprocally turning the lock-up clutch operating shaft 86.

An electric or electromagnetic lock-up clutch actuator 87 is connected to the lock-up clutch operating shaft 86 for turning the lock-up clutch operating shaft 86, as shown in FIG. 6. The lock-up clutch actuator 87 receives an output signal from a vehicle speed sensor 88 for detecting a vehicle speed equal to or lower than a predetermined value, and moves in response to the signal to turn the lock-up clutch operating shaft 86 in a direction to move the valve operating plate 82 rightwards as viewed in FIG. 3.

The operation of the lock-up clutch Lc will be described below. When the vehicle speed sensor 38 detects a vehicle speed equal to or lower than the predetermined value to deliver an output signal, the lock-up clutch actuator 87 is operated under reception of the signal to turn the lock-up clutch operating shaft 86, thereby moving the valve operating plate 82 rightwards as viewed in FIG. 3. With this movement, the control rod 81 opens the control valve 80 to permit the opposite side faces of the pressing plate 72 to communicate with each other through the communication groove 81a, as shown in the lower half of the FIG. 3 and in FIG. 2. Therefore, the hydraulic pressure in the hydraulic pressure chamber 77 is applied equally to the opposite side faces of the pressing plate 72, and the pressing plate 72 is urged to the retreated position by the urging force of the control rod 81 to the control valve 80, whereby the friction engagement of the three plates: the pressing plate 72, the pressure receiving plate 73 and the friction clutch plate 74 does not occur, and the lock-up clutch Lc assumes the OFF state. Therefore, in this state, the relative rotation of the pump impeller 50 and the turbine impeller 51 is possible and hence, a torque amplifying effect can be provided. In this case, the valve bores 79 in the pressure receiving plate 73 are closed by the control rods 81 and hence, the useless leakage of the hydraulic pressure from the hydraulic pressure chamber 77 to the valve bores 79 can be prevented.

When the vehicle speed is increased up to a level equal to or higher than the predetermined value, and the vehicle speed sensor 88 stops the delivery of the output signal, the lock-up clutch actuator 87 returns to the inoperative state, and the valve operating plate 82 is retreated to the left position by the biasing force of the return spring 84, as shown in the upper half of FIG. 3 and in FIG. 11, thereby permitting the closing of the valve bores 78 by the control valve 80, and opening the inner periphery of the friction clutch plate 74 to the outside of the valve bores 79 through the communication grooves 81a in the control rods. Therefore, the pressing plate 72 receives the hydraulic pressure in the hydraulic pressure chamber 77 on its inner surface to urge the friction clutch plate 74 against the pressure receiving plate 73. As a result, the pressing plate 72, the pressure receiving plate 73 and the friction clutch plate 74 are brought into engagement with one another, whereby the lock-up clutch Lc is brought into the ON state to connect the pump impeller 50 and the turbine impeller 51 directly to each other. Therefore, during traveling of the motorcycle Vm at a high speed, the slipping of both the impellers 50 and 51 can be eliminated to enhance the transmitting efficiency.

During operation of the engine E, the oil discharged from the oil pump 44 flows first into the upstream supply oil passage 27a and then via the first flow-in bore 43a into the hydraulic pressure chamber 25 in the shifting clutch Cc to contribute the operation and cooling of the shifting clutch Cc. In addition, the oil flows via the second flow-in bore 43b into the oil chamber defined between the pump impeller 50 and the turbine impeller 51 and into the hydraulic pressure chamber 77 in the lock-up clutch Lc to contribute to the operation and cooling of the torque converter T and the lock-up clutch Lc. The oil discharged from the hydraulic pressure chamber 77 through the flow-out bore 45 into the downstream supply oil passage 27b is supplied to the needle bearing 49 around the outer periphery of the crank pin to contribute to the lubrication of the needle bearing 49. The oil finishing the lubrication is scattered the surroundings with the rotation of the crankshaft 2 to lubricate the piston 7 and the like. The oil pump 44 originally acts to supply the lubricating oil to the engine E, but the oil is utilized as an operating oil for the shifting clutch Cc, the torque converter T and the lock-up clutch Lc. Therefore, it is unnecessary to mount an exclusive oil pump for supplying the operating oil, thereby enabling the simplification of the arrangement.

The upstream and downstream supply oil passages 27a and 27b provided in the crankshaft 2 communicates directly with each other through the orifice 48 and hence, a portion of the oil fed from the oil pump 44 to the upstream supply oil passage 27a passes through the orifice 48 to the downstream supply oil passage 27b without via the torque converter T and the like. Therefore, the proportion of distribution of the oil to the torque converter T and the engine E can be determined freely by selection of the orifice 48.

On the other hand, in the torque converter T, the somewhat transmission of the torque occurs between the pump impeller 50 and the turbine impeller 51 even during idling of the engine E. However, the shifting clutch Cc is controlled to the OFF state during idling of the engine E and hence, even if the first-speed gear train G1 of the multi-stage transmission M has been established, the transmission of a power to the shifting clutch Cc and the like can be cut off, irrespective of the presence of the torque converter T, thereby preventing a creeping phenomenon. This means that the transmitting members of the multi-stage transmission M are put in an unloaded state. Therefore, even when the shifting gear G2b is shifted leftwards as viewed in FIG. 2 to establish the first-speed gear train G1 for starting the motorcycle Vm, this shifting can be conducted smoothly without being accompanied by a torque shock. When the rotation of the engine E is accelerated to start the motorcycle, the shifting clutch Cc is brought at a stretch to the ON state beyond the half-clutched area, but the accompanying torque shock is absorbed by the action of mutual slipping of the pump impeller 50 and the turbine impeller 51 of the torque converter T, whereby the smooth starting of the motorcycle can be carried out with the aid of the amplifying effect. This can contribute to an improvement in riding comfort.

Even when the shifting gears G2b and G3a are shifted in a desired direction during traveling of the motorcycle to conduct a desired shifting, the shifting clutch Cc is controlled each time to the OFF state, as described above, and the transmitting members of the multi-stage transmission M are brought into their unloaded states. Therefore, the shifting can be conducted smoothly without being accompanied by a torque shock. Even after the shifting, the shifting clutch Cc is brought at a stretch to the ON state beyond the half-clutched area, but the accompanying torque shock is absorbed by the action of mutual slipping of the pump impeller 50 and the turbine impeller 51 of the torque converter T. Therefore, a sense of incompatibility is not provided to an occupant, and an improvement in riding comfort is provided.

In this way, the torque shock produced with turning-on and off of the shifting clutch is absorbed to the torque converter T and hence, the shifting clutch Cc can be constructed into an on and off type having no half-clutched area. In addition, it is possible to avoid the heating and wearing of the friction portion due to the half-clutching to enhance the durability of the shifting clutch Cc.

The torque capacity of the shifting clutch Cc is set larger than that of the torque converter, as described above, and hence, even in a fully loaded state, the slipping of the shifting clutch Cc can be prevented, and the durability of the shifting clutch can be ensured.

In addition, the crankshaft 2 is rotated at a high speed by the input shaft 10 of the multi-stage transmission M driven through the reducing device 14 by the crankshaft 2. Therefore, the transmitted torque borne by the torque converter T and the shifting clutch Cc mounted to the crankshaft 2 is relatively small and hence, the capacities of the torque converter T and the shifting clutch Cc can be reduced correspondingly, leading to the compactness of the torque converter T and the shifting clutch Cc. In addition, the compactness of the power unit P can be provided despite the provision of both the torque converter T and the shifting clutch Cc.

Moreover, among the primary reducing device 14, the torque converter T and the shifting clutch Cc, the primary reducing device 14 is disposed nearest to the right sidewall of the crankcase 1, and the torque converter T is disposed nearer to the right sidewall. Therefore, the flexing moment applied to the crankshaft 2 and the input shaft 10 with the operation of the primary reducing device 14 can be minimized. In addition, the weight of the torque converter T is larger than that of the shifting clutch Cc, but the flexing moment applied to the crankshaft 2 due to the weights of the torque converter T and the shifting clutch Cc can be minimized, whereby the durability of the crankshaft 2, the input shaft 10 and the bearings 3' and 12' supporting the crankshaft 2 and the input shaft 10 can be enhanced in cooperation with the compactness of the torque converter T and the shifting clutch Cc.

Additionally, since the group of the primary reducing device 14, the torque converter T and the shifting clutch Cc and the group of the timing transmitting device 91 and the generator 16 are disposed on the crankshaft 2 on the opposite sides with the crank chamber interposed therebetween, as described above, the lateral distribution of the weight of the power unit P can be equalized. Moreover, even in a 4-cycle engine, the primary reducing device 14 can be disposed nearest to the right sidewall of the crankcase 1 without being interfered in any way by the timing transmitting device 91, and the durability of the crankshaft 2, the input shaft 10 and the bearings 3' and 12' supporting the crankshaft 2 and the input shaft 10 can be ensured.

Further, since the generator 16 and the torque converter T on the crankshaft 2 are disposed coaxially, the rotational vibration generated in the generator 16 can be absorbed by the torque converter T to contribute to the silence of the power unit P.

Figure 13:
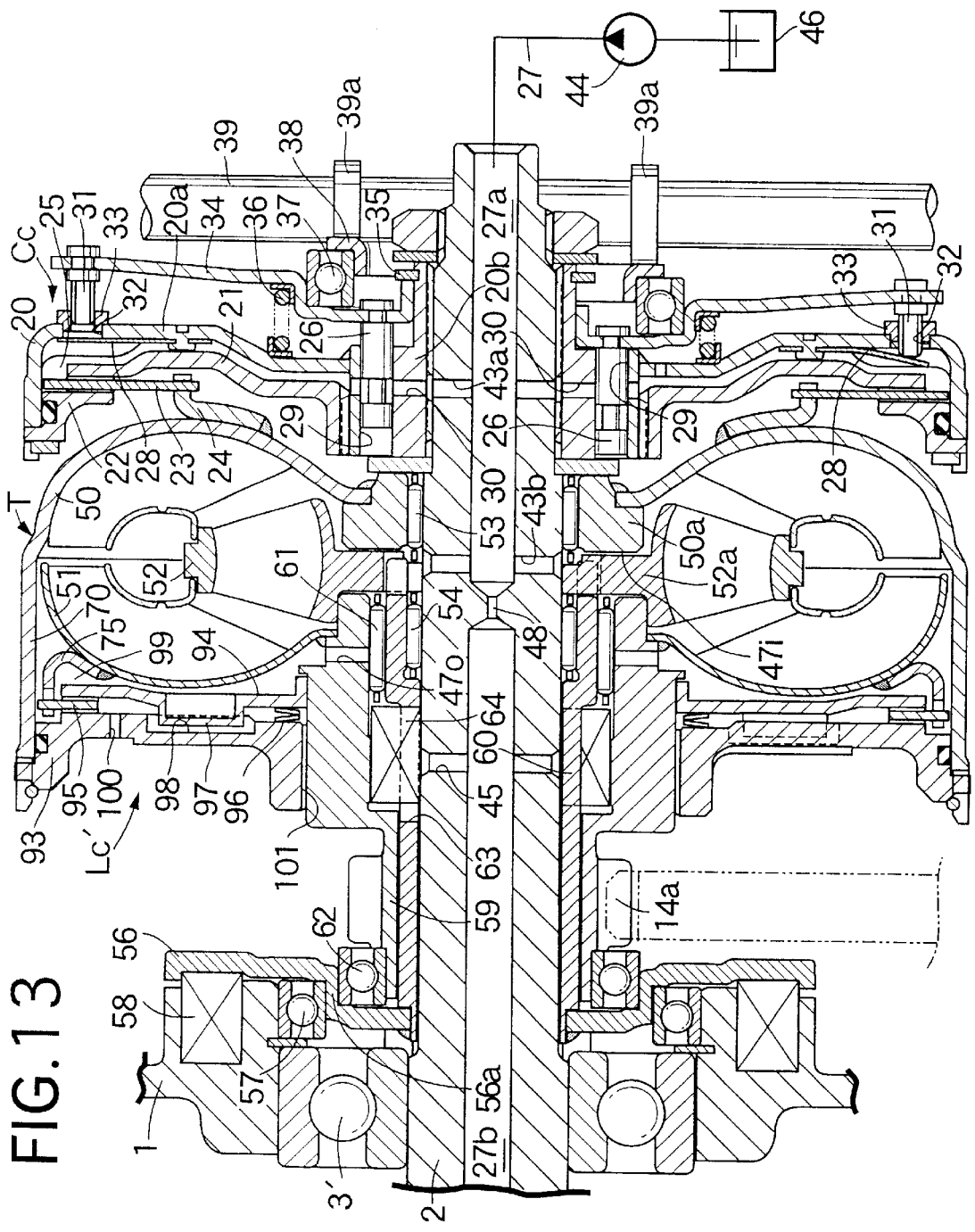
FIG. 13 is a sectional view similar to FIG. 3, but according to a second embodiment of the present invention.

A second embodiment of the present invention shown in FIG. 13 will now be described.

The second embodiment is different from the previously described embodiment in respect of that a lock-up clutch Lc' is constructed into an automatically controlled type depending on the rotational speed of the pump impeller 50. More specifically, the lock-up clutch Lc' includes a cylindrical pump extension 70 connected to an outer periphery of the pump impeller 50 and surrounding the turbine impeller 51, a pressure receiving plate 93 which is rotatably carried on the turbine shaft 59 and oil-tightly coupled to an opened end of the pump extension 70, a pressing plate 94 which is slidably carried on the turbine shaft 59 and disposed in an opposed relation to an inner surface of the pressure receiving plate 93, an annular friction clutch 95 interposed between the pressing plate 94 and the pressure receiving plate 93, a dished or belleville return spring 96 interposed between the pump extension 70 and the pressing plate 94 for biasing the pressing plate 94 in a direction opposite to the pressure receiving plate 93. The friction clutch plate 95 has an outer periphery engaged with the transmitting plate 75 secured to the outer surface of the turbine impeller 51. The pressure receiving plate 93 and the pressing plate 94 have a dog 97 and a recess 98 provided in opposed surfaces thereof, respectively and engaged with each other, so that the pressure receiving plate 93 and the pressing plate 94 can be slid in an axial direction relative to each other, while being rotated in unison with each other.

A hydraulic pressure chamber 99 is defined in the inside of the pump extension 70 by the pressure receiving plate 93. The hydraulic pressure chamber 99 communicates with the insides of the pump impeller 50 and the turbine impeller 51 through opposed clearances between the pump impeller 50 and the turbine impeller 51, so that the oil is filled in the hydraulic pressure chamber 99.

Provided in the pressure receiving plate 93 are an escape bore 100 which opens the inner periphery of the friction clutch plate 95 to the outside of the pressure receiving plate 93, and an air-vent groove 101 extending axially in an inner peripheral surface of the pressure receiving plate 93.

Another arrangement is the same as in the arrangement in the first embodiment and hence, portions or components corresponding to those in the first embodiment are designated by like reference characters and the description of them is omitted.

When the rotational speed of the pump impeller 50 is equal to or lower than a predetermined value, the centrifugal force of the oil filling the hydraulic pressure chamber 99 within the pump extension 70 is small. For this reason, the hydraulic pressure in the hydraulic pressure chamber 99 does not rise, and the pressing plate 94 has been returned to its retreated position by the biasing force of the return spring 96 to release the friction clutch plate 95. Therefore, the lock-up clutch Lc' is in its OFF state.

During this time, the oil in the hydraulic pressure chamber 99 flows out to the outside through the escape bore 100 in the pressure receiving plate 93, but the amount thereof is extremely small. Therefore, the flowing-out of the oil does not hinder the rising of the hydraulic pressure in the hydraulic pressure chamber 99.

When the rotational speed of the pump impeller 50 exceeds the predetermined value, the centrifugal force of the oil in the hydraulic pressure chamber 99 increases correspondingly to rise the hydraulic pressure in the hydraulic pressure chamber 99. Therefore, the pressing plate 94 is advanced toward the pressure receiving plate 93 by such risen hydraulic pressure to clamp the friction clutch plate 95 between the pressing plate 94 and the pressure receiving plate 93, whereby the lock-up clutch Lc' is brought into its ON state. The lock-up clutch Lc' in the ON state connects the pump impeller 50 and the turbine impeller 51 directly to each other and hence, the mutual slipping of both the impellers 50 and 51 can be eliminated to enhance the transmitting efficiency.

In this case, the rising of the hydraulic pressure does not occur on the side of the inner periphery of the friction clutch plate 95, because the oil flows out through the escape bore 100. Therefore, a large difference in pressure is produced between the opposite surfaces of the pressure plate 94, whereby the clamping of the friction clutch plate 95 is carried out effectively.

Thus, by utilizing the centrifugal hydraulic pressure in the hydraulic pressure chamber 99 within the pump extension 70 connected to the pump impeller 50, it can be achieved easily that the automatic controlling of the lock-up clutch Lc' depends on the rotational speed of the pump impeller 50.

Figure 14:
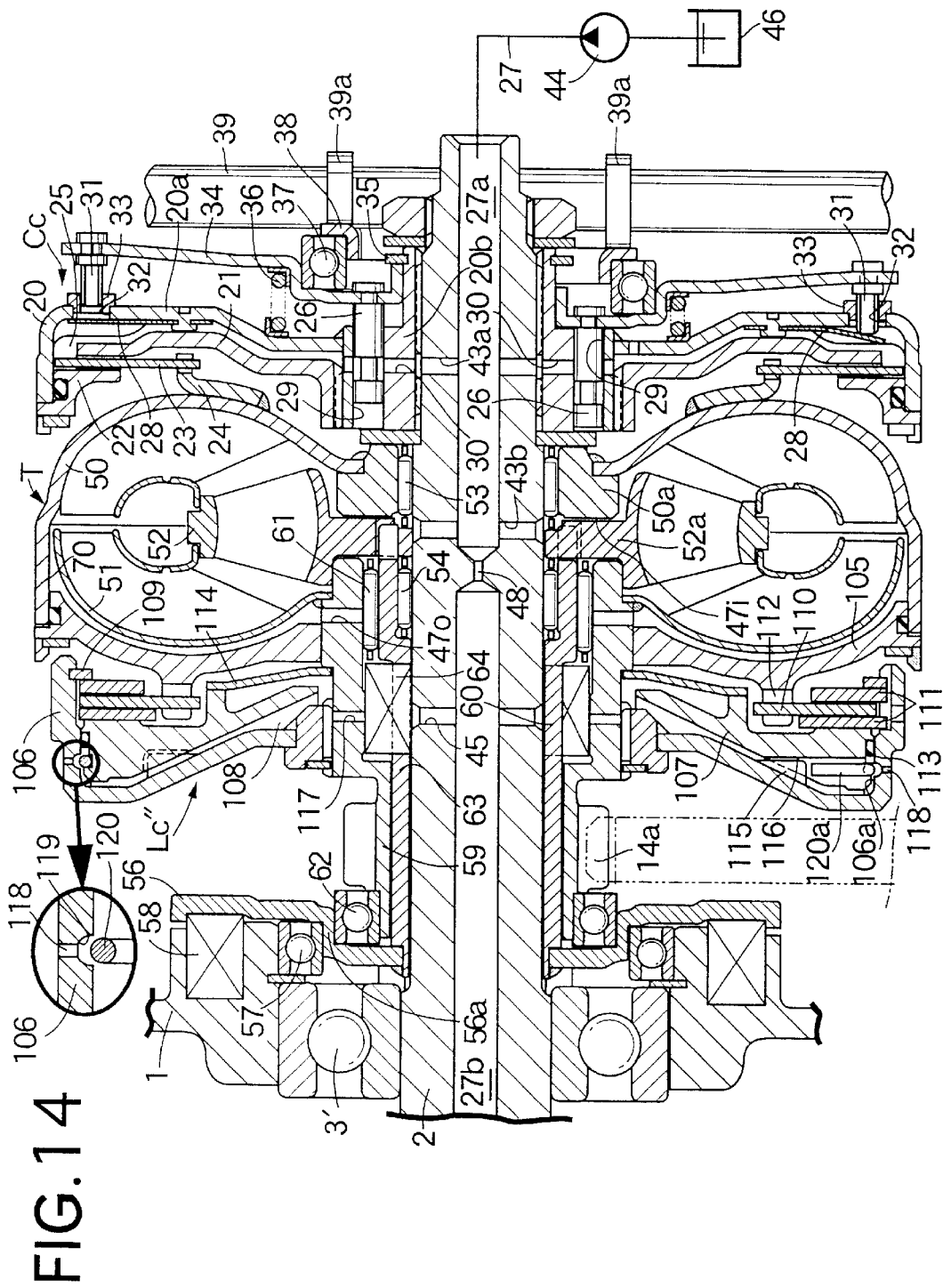
FIG. 14 is a sectional view similar to FIG. 3, but according to a third embodiment of the present invention.

A third embodiment of the present invention shown in FIG. 14 will be described below.

The third embodiment is different from the second embodiment in respect of that a lock-up clutch Lc" is constructed into an automatically controlled type depending on the rotational speed of the turbine impeller 52. The lock-up clutch Lc" is disposed outside a torque converter side-cover 105 which is oil-tightly coupled to the pump extension 70 of the pump impeller 50 to cover the turbine impeller 51. The torque converter side-cover 105 is rotatably carried on an outer periphery of the turbine shaft 59, and the inside thereof communicates with an oil chamber defined between the pump impeller 50 and the turbine impeller 51, and is filled with a working oil, as is the oil chamber.

The lock-up clutch Lc" includes a flat clutch cylinder 106a spline-coupled to a left end of the turbine shaft 59 with its opened end turned toward the torque converter side-cover 105, a pressing piston 107 slidably received in a cylinder bore 106 in the clutch cylinder 106 with a seal member 113 interposed therebetween to define a hydraulic pressure chamber 108 between the pressing piston 107 and an end wall of the clutch cylinder 106, a pressure receiving ring 109 locked to an inner peripheral surface of the clutch cylinder 106 at a location closer to the opened end, a plurality of (two in the illustrated embodiment) annular driven friction clutch plates 111, 111 which are slidably spline-engaged with the inner peripheral surface of the clutch cylinder 106 between the pressure receiving ring 109 and the pressing piston 107, an annular driving friction clutch plate 110 which is interposed between the driven friction clutch plates 111, 111 and which has an inner peripheral surface axially slidably engaged with a plurality of transmitting claws 112 projectingly provided on an outer surface of the torque converter side-cover 105, and a piston return spring 114 disposed between the pressing piston 107 and the torque converter side-cover 105 on the side of the inner peripheries of the driving and driven friction clutch plates 110 and 111 for biasing the pressing piston 107 toward the hydraulic pressure chamber 108. The clutch cylinder 106 and the pressing piston 107 have dogs 115 and recesses 116 provided in opposed surfaces thereof, respectively and engaged with each other, so that the clutch cylinder 106 and the pressing piston 107 can be slid in an axial direction relative to each other, while being rotated in unison with each other.

A fluid outlet 47o and an inlet bore 117 are provided in the turbine shaft 59, and permit the inside of the torque converter side-cover 105 and the hydraulic pressure chamber 108 in the clutch cylinder 106 to communicate with the inner periphery of the turbine shaft 59. Thus, the inside of the torque converter side-cover 105 and the hydraulic pressure chamber 108 in the clutch cylinder 106 are put into communication with each other through the fluid outlet 47o and the inlet bore 117 and through the inside of the turbine shaft 59.

A plurality of escape bores 118 are provided in a peripheral wall of the clutch cylinder 106 at circumferentially equal distances to open the hydraulic pressure chamber 108 to the outside of the clutch cylinder 106. An annular groove 119 is provided in the inner peripheral surface of the clutch cylinder 106 to permit the communication between the escape bores 118, and a centrifugal valve 120 is disposed in the annular groove 119 and closes the escape bores 118 by a centrifugal force, when the rotational speed of the clutch cylinder 106 is equal to or higher than a predetermined value. The centrifugal valve 120 is comprised of a free-end ring made of a single resilient wire material, with at least one end 120a thereof engaged in one of the recesses 116 in the pressing piston 107, so that the centrifugal valve 120 is rotated along with the pressing piston 107 and thus the clutch cylinder 106. The centrifugal valve 120 is designed, so that it is contracted radially to open the escape bores 118 in its free state, but when the rotational speed of the clutch cylinder 106 is equal to or higher than predetermined value, the centrifugal valve 120 is expanded radially by the centrifugal force to come into close contact with a bottom surface of the annular groove 119 to close all the escape bores 118.

Another arrangement is the same as the arrangement in the first embodiment and hence, portions and components corresponding to those in the first embodiment are designated by like reference characters and the description of them is omitted.

When the oil supplied from the oil pump 44 to the upstream supply oil passage 27a in the crankshaft 2 enters the second flow-in bore 43b, the oil flows into the oil chamber between the pump impeller 50 and the turbine impeller 51 through the fluid inlet 47i to fill the oil chamber and the inside of the torque converter side-cover 105, and then flows through the fluid outlet 47o into the turbine shaft 59. The oil flowing out of the turbine shaft 59 is diverted into the inlet bore 117 and the flow-out bore 45. The oil entering the inlet bore 117 flows into the hydraulic pressure chamber 108 in the lock-up clutch Lc", while the oil entering the flow-out bore 45 flows to the downstream supply oil passage 27b in the crankshaft 2, as in the previous embodiment.

The clutch cylinder 106 of the lock-up clutch Lc" is spline-coupled to the turbine shaft 59, and it is rotated along with the turbine shaft 59. Therefore, when the rotational speed of the turbine shaft 59 is equal to or lower than the predetermined value, the centrifugal valve 120 is maintained in its contracted state against the centrifugal force to open the escape bores 118, so that the oil flowing through the inlet bore 117 into the hydraulic pressure chamber 108 flows out of the clutch cylinder 106 through the escape bores 118. Therefore, the hydraulic pressure in the hydraulic pressure chamber 108 does not rise, whereby the pressing piston 107 is retained in its retreated position by the biasing force of the piston return spring 114, and the driving and driven friction clutch plate 110 and 111 are put into their non-engaged states. Namely, the lock-up clutch Lc" is in the OFF state.

In this case, if a foreign matter such as a cut powder and a worn powder exists in the hydraulic pressure chamber 108, the foreign matter can be discharged out of the clutch cylinder 106 through the escape bores 118 along with the oil.

When the rotational speed of the turbine shaft 59 exceeds the predetermined value, the centrifugal valve 120 rotated along with the turbine shaft 59 is expanded by an own increased centrifugal force to close all the escape bores 118. As a result, the hydraulic pressure chamber 108 is filled with the oil supplied through the inlet bore 117, and a hydraulic pressure is developed in the hydraulic pressure chamber 108 by the centrifugal force of the oil. Thus, the pressing piston 107 is advanced toward the pressure receiving ring 109 by such developed hydraulic pressure to bring the driving and driven friction clutch plates 110 and 111 into the friction engaged states, whereby the lock-up clutch Lc" is brought into the ON state. The lock-up clutch Lc" in the ON state brings the pump impeller 50 and the turbine impeller 59 into directly connected states and hence, the mutual slipping of the pump impeller 50 and the turbine impeller 59 can be eliminated to enhance the transmitting efficiency.

When the rotational speed of the turbine impeller 59 reduces to lower than the predetermined value, the centrifugal valve 120 openes again and hence, the remaining pressure in the hydraulic pressure chamber 108 can be released promptly through the escape bores 118. Therefore, the turning-off performance of the lock-up clutch Lc" can be enhanced.

Thus, by utilizing the centrifugal hydraulic pressure in the hydraulic pressure chamber 108 within the clutch cylinder 106 connected to the turbine impeller 59, it can be achieved easily that the automatic controlling of the lock-up clutch Lc" depends on the rotational speed of the turbine impeller 59.

Finally, a fourth embodiment of the present invention shown in FIGS. 15 to 17 will be described below.

Figure 5:
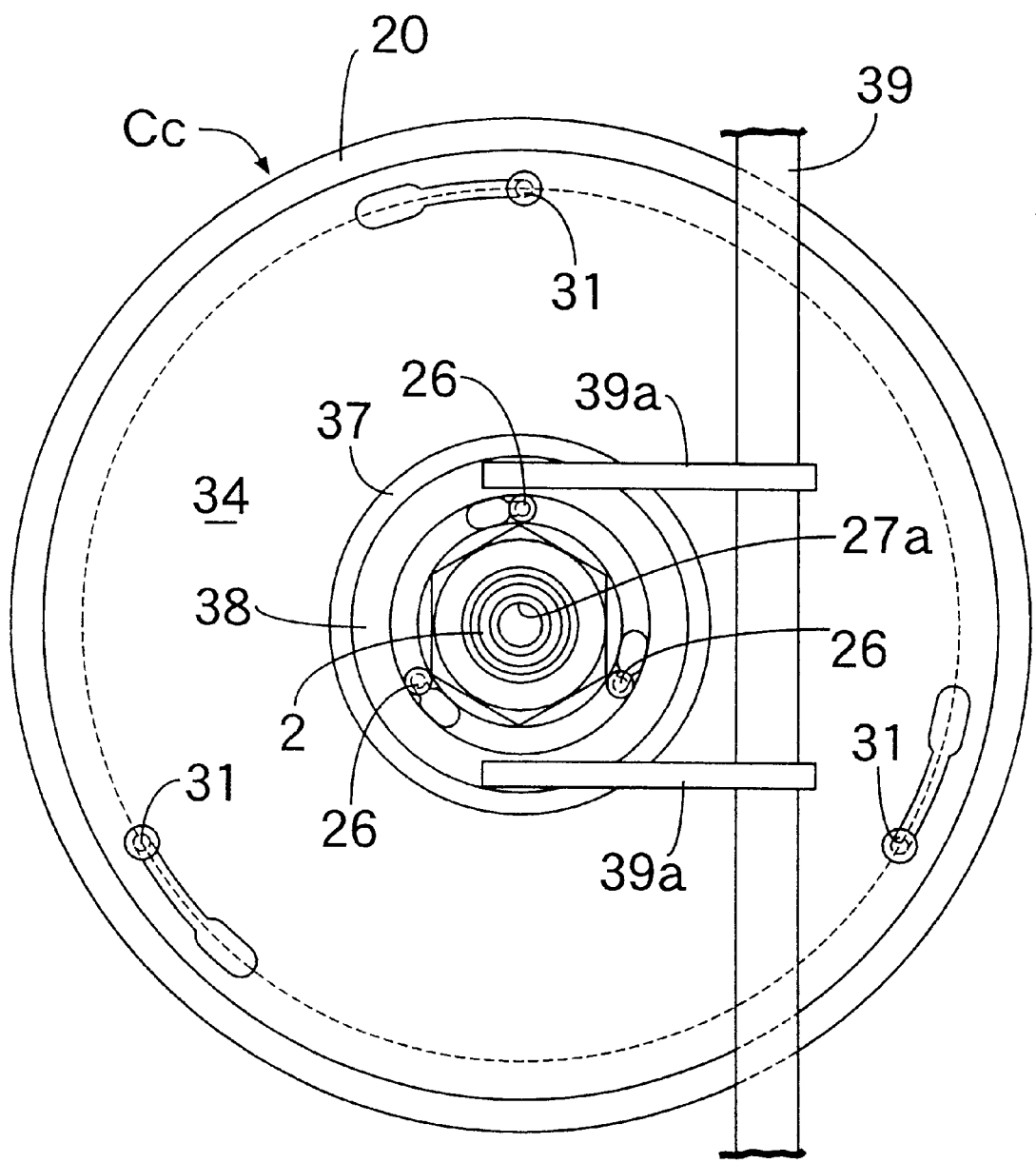
Figure 16:
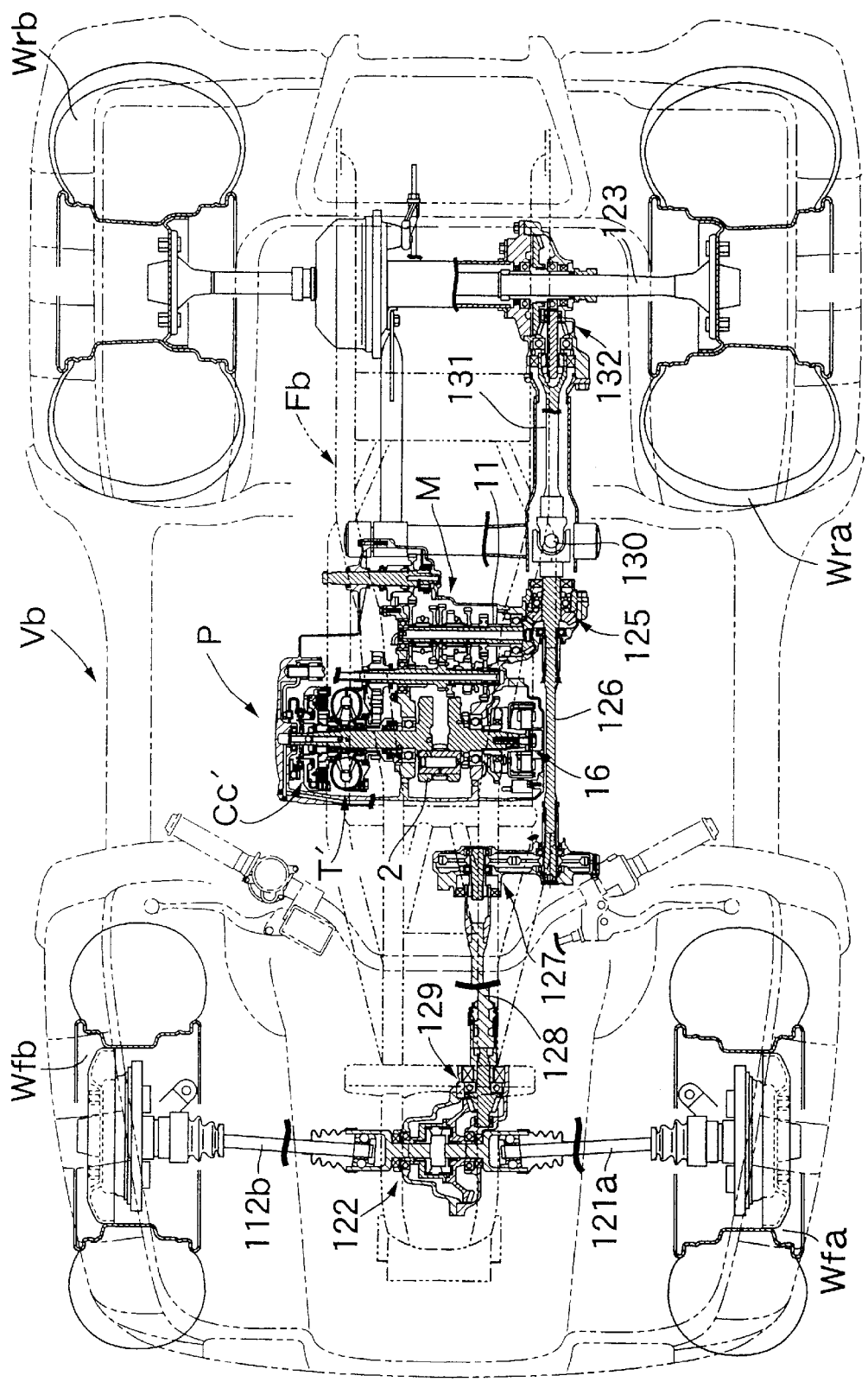

Referring first to FIGS. 5 and 16, in a four-wheel buggy Vb, a fuel tank Tfb and a saddle Sb are mounted respectively at a front location and a rear location on an upper portion of a body frame Fb which supports a pair of front wheels Wfa and Wfb and a pair of rear wheels Wra and Wrb, and a power unit P is mounted on a lower portion of the body frame Fb. Left and right front-wheel driving shafts 121a and 121b connected to the left and right front wheels Wfa and Wfb, respectively, are connected to each other by a differential 122, and the left and right rear wheels Wra and Wrb are connected directly to each other by a single rear-wheel driving shaft 123.

The power unit P is disposed with a crankshaft 2 of an engine E turned laterally of the four-wheel buggy Vb. A driving shaft 126 is disposed longitudinally adjacent a generator 16 of the power unit P and connected to an output shaft 11 of a transmission M through a bevel gear transmitting device 125. The driving shaft 126 is connected at its front end to the differential 122 through a front propeller shaft 128 and a bevel gear reducing device 129 and at its rear end to the rear-wheel driving shaft 123 through an adjustable joint 130, a rear propeller shaft 131 and a bevel gear reducing device 132. Therefore, the front wheels Wfa and Wfb and the rear wheels Wra and Wrb can be driven by a power transmitted from the power unit P to the driving shaft 126.

Figure 17:
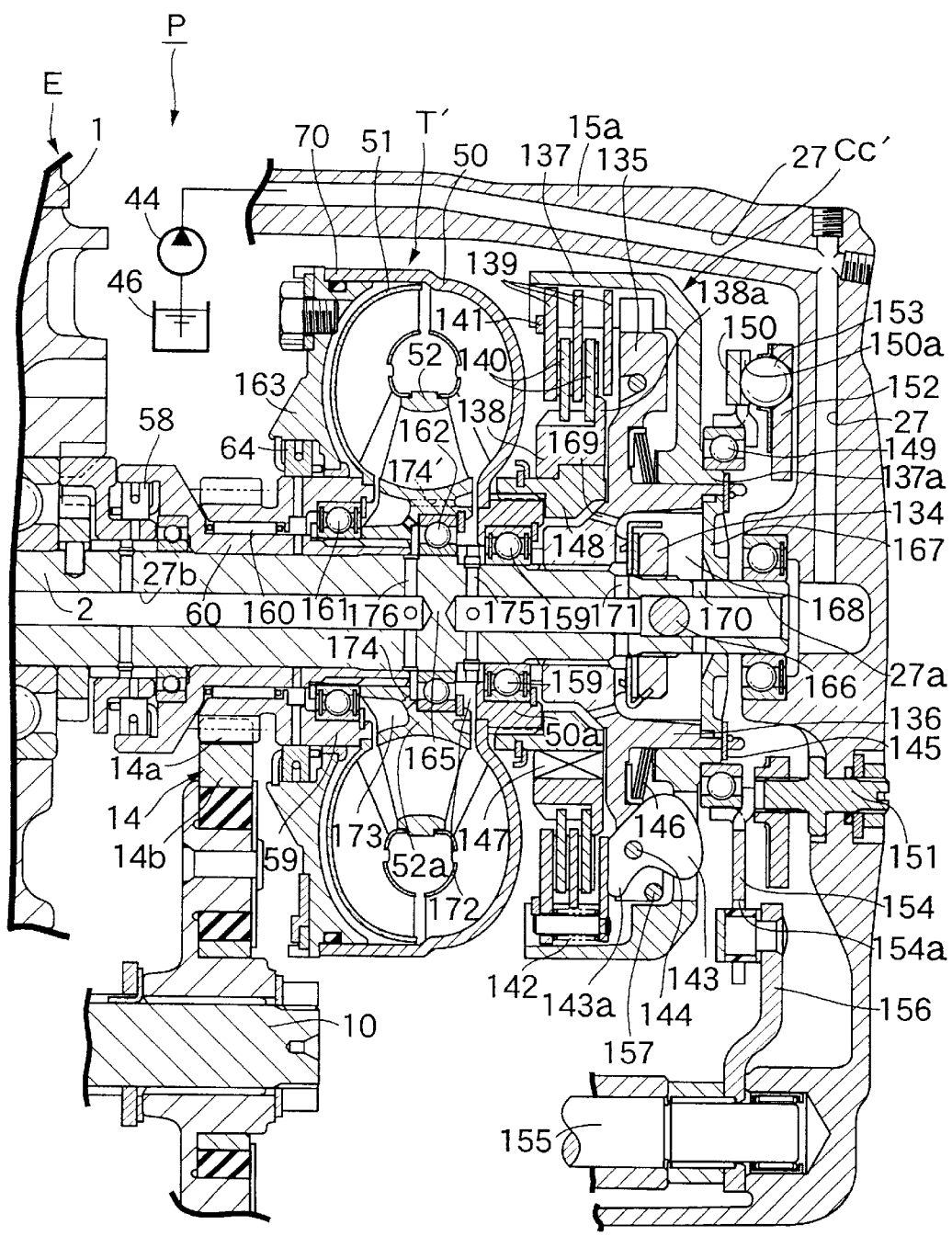

As shown in FIG. 17, the power unit P in the fourth embodiment is different from that in the first embodiment in respect of the arrangements of a shifting clutch Cc' and a torque converter T'.

The shifting clutch Cc' includes a driving plate 135 spline-fitted over the crankshaft 2 and secured thereto by a nut 134, and a bottomed cylindrical clutch outer 137 slidably carried on a support tube 136 which is integrally and projectingly provided on an outer surface of the driving plate 135. The driving plate 135 is disposed adjacent an end wall of the clutch outer 137 and has an outer periphery spline coupled to an inner periphery of the clutch outer 137. A clutch inner 138 is disposed coaxially within the clutch outer 137, and a plurality of annular driving friction plates 139 slidably spline-engaged with an inner periphery of a cylindrical portion of the clutch outer 137 and a plurality of annular driven friction plates 140 slidably engaged with an outer periphery of the clutch inner 138 are disposed in an alternately laminated manner. In this case, two driving friction plates 139, 139 are disposed inside and outside the group of the friction plates 139 and 140, and a pressure receiving ring 141 facing an outer surface of the outer driving friction plate 139 is locked to the inner periphery of the cylindrical portion of the clutch outer 137.

A spacing spring 142 is mounted under compression between both the driving friction plates 139 and 139 for biasing the driving friction plates 139 and 139 in a spacing direction. A flange 138a projecting provided on the outer periphery of the clutch inner 138 is opposed to the inner driven friction plate 140.

A plurality of centrifugal weights 143 are swingably mounted to the driving plate 135 by a pivot 144, and disposed so that an urging arm portion 143a of each centrifugal weight 143 can urge the inner driving friction plate 139. A stopper 145 is mounted on the support tube 136 of the driving plate 135 for defining a limit of sliding movement in an outward direction of the clutch outer 137 (in a rightward direction as viewed in FIG. 17), and a clutch spring 146 is mounted between the driving plate 135 and the clutch outer 137 for biasing the clutch outer 137 toward the stopper 145.

An annular transmitting member 148 is connected to the clutch inner 138 through a known reverse-load transmitting screw mechanism 147, and spline-coupled to an outer periphery of a boss 50a of a pump impeller 50 of the torque converter T'.

During idling of the engine E, the rotational speed of the driving plate 135 rotated along with the crankshaft 2 is low, and the centrifugal force of the weight portion of the centrifugal weight 143 is small. Therefore, the urging force of the urging arm portion 143a to the driving friction plate 139 is also small. Therefore, the driving friction plates 139, 139 on the opposite sides have been spaced apart from each other by the biasing force of the spacing spring 142 to release the driven friction plates 140, and the shifting clutch Cc' is in its OFF state. Therefore, the shifting clutch Cc' in the OFF state cuts off the transmission of the power from the crankshaft 2 to the pump impeller 50 of the torque converter T' and hence, even if a wheel brake is not operated, it is possible to prevent the very slow-speed forward movement of the four-wheel buggy Vb due to a creep effect provided by the torque converter T'.

When the rotational speed of the engine E is increased to equal to or higher than a predetermined value, the centrifugal force of the weight portion of the centrifugal weight 143 is increased with such increase in rotational speed, whereby the urging arm portion 143a strongly urges the group of the driving and driven friction plates 139 and 140 against the pressure receiving ring 141 to bring the driving and driven friction plates 139 and 140 into friction engagement with each other. Therefore, the shifting clutch Cc' is automatically brought into the ON state to transmit the power of the crankshaft 2 from the clutch inner 138 through the transmitting member 148 to the pump impeller 50 of the torque converter T'.

When the urging force of the centrifugal weights 143 to the group of the driving and driven friction plates 139 and 140 exceeds a preset load of the clutch spring 146, the clutch outer 137 is displaced leftwards as viewed in FIG. 17 while flexing the clutch spring 146. Moreover, the centrifugal weights 143 are thereafter received by a stopper ring 157 on the clutch outer 137, so that the further outward swinging movement is inhibited. The force of mutual pressure contact between the driving and driven friction plates 139 and 140 is not increased to larger than the load of the clutch spring 146.

The clutch outer 137 has a boss 137a protruding on its outer surface, and a release cam 150 is mounted on the boss 137a with a release bearing 149 interposed therebetween. A stationary cam 152 mounted to the right side-cover 15a through an adjusting bolt 151 is opposed to the release cam 150, and a ball 153 is mounted on the stationary cam 152 and engaged in a recess 150a in the release cam 150.

The release cam 150 includes an arm 154 which has a notch 154a at its tip end and which protrudes radially, and a tip end of a clutch arm 156 secured to a change spindle 155 used for switching operation of the transmission M is engaged in the notch 154a.

Thus, when the change spindle 155 is turned for switching of the transmission M during traveling of the four-wheel buggy Vb, the clutch arm 156 turns the release cam 150 in first half of such turning movement of the change spindle 155, and the release cam 150 pushes the ball 153 on the stationary cam 152 out of the recess 150a with the turning movement of the release cam 150. A reaction force produced at that time causes the clutch outer 137 to be urged leftwards as viewed in FIG. 17 against the load of the clutch spring 146 through the release bearing 149, thereby spacing the pressure receiving ring 141 apart from the group of the driving and driven friction plates 139 and 140. On the other hand, the outward swinging movement of the centrifugal weights 143 is inhibited by the stopper ring 157, as described above, and the urging arm portion 143a is stopped at a previous urging position for the driving and driven friction plates 139 and 140. Therefore, the driving and driven friction plates 139 and 140 are reliably spaced apart from each other, whereby the shifting clutch Cc' is brought into the OFF state.

The second half of the turning movement of the change spindle 155 is placed at the service of switching of the transmission M. After the switching of the transmission M, the release cam 150 is returned to its original position with the returning movement of the change spindle 155, and the shifting clutch Cc' is returned to the ON state by cooperation of the biasing force of the clutch spring 146 with the centrifugal force of the connected centrifugal weights 143.

In the torque converter T', the boss 50a of the pump impeller 50 spline-coupled to the transmitting member 148 is carried on the crankshaft 2 with a ball bearing 159 interposed therebetween, and the turbine shaft 59 connected to the turbine impeller 51 is carried on the stator shaft 60 with left and right needle bearings 160 and ball bearings 161 with interposed therebetween. The boss 52a of the stator impeller 52 is carried on the crankshaft 2 with ball bearings 162 or needle bearings interposed therebetween, and is spline-coupled to the stator shaft 60.

A torque converter side-cover 163 is oil-tightly coupled to the pump extension 70 connected to the pump impeller 50 to cover the outside of the turbine impeller 51, and a one-way clutch 64 is interposed between the torque converter side-cover 163 and the turbine shaft 59 for transmitting only a reverse load torque from the turbine shaft 59 to the torque converter side-cover 163. Therefore, when a reverse load torque applied to the driving shaft 126 is transmitted via the transmission M and the primary reducing device 14 to the turbine shaft 59 during conduction of an engine brake, the one-way clutch 64 is brought into a connected state to transmit the reverse load torque from the pump extension 70 to the pump impeller 50 and the transmitting member 148.

When the reverse load torque has been transmitted to the transmitting member 148, the clutch inner 138 in the shifting clutch Cc' is urged leftwards as viewed in FIG. 17 by operation of the screw mechanism 147, whereby the flange 138a of the clutch inner 138 urges the group of the driving and driven friction plates 139 and 140 against the pressure receiving ring 141 with the inner driving friction plate 139 left, and hence, the shifting clutch Cc' is brought into the ON state. Therefore, the reverse load torque is transmitted to the crankshaft 2 to provide a good engine brake effect.

A partition wall 165 is provided on the crankshaft 2 for partitioning the upstream and downstream supply oil passages 27a and 27b from each other. A partitioning plug 166 is press-fitted into the upstream supply oil passage 27a for bisecting the upstream supply oil passage 27a into an upstream section and a downstream section.

In the shifting clutch Cc', an oil chamber 168 is defined in the support tube 136 with an opened surface closed by a lid 167, and communicates with the inner periphery of the clutch inner 138 through a through-bore 169. The oil chamber 168 also communicates with the upstream section and the downstream section of the upstream supply oil passage 27a through a flow-in bore 170 and a flow-out bore 171 which are provided in the crankshaft 2.

In the torque converter T', a first small oil chamber 172 is provided on the right of the boss 52 of the stator impeller 52, and a second small oil chamber 173 is provided on the left of the boss 52a. The first small oil chamber 172 communicates with the oil chamber defined between the pump impeller 50 and the turbine impeller 51 and also with the downstream section of the upstream supply oil passage 27a through a flow-in bore 175 provided in the crankshaft 2. The second small oil chamber 173 communicates with the oil chamber defined between the turbine impeller 51 and the stator impeller 52 and also with the downstream supply oil passage 27b through a flow-out bore 176 provided in the crankshaft 2.

Further, the first and second small oil chambers 172 and 173 communicate with each other through clearances between the bearings 162 carrying the boss 52a and a through-bore 174 provided in the boss 52a.

When the oil is supplied from the oil pump 44 driven by the engine E through the oil passage 27 to the upstream supply oil passage 27a, the oil flows through the flow-in bore 170 into the oil chamber 168, and is diverted therefrom into the through-bore 169 and the flow-out bore 171. The oil passed through the through-bore 169 is supplied friction portions and sliding portions of the shifting clutch Cc' to contribute to the cooling and lubrication of them.

On the other hand, the oil passed through the flow-out bore 171 flows through the downstream section of the upper supply oil passage 27a and then through the flow-in bore 175 via the first small oil chamber 172 to fill the oil chamber defined between the pump impeller 50 and the turbine impeller 51. Then, the oil flows from the oil chamber via the second small oil chamber 173 and the flow-out bore 176 to the downstream supply oil passage 27b to lubricate the various portions of the engine E.

The boss 52a of the stator impeller 52 is carried on the crankshaft 2 with the bearings 162 interposed therebetween and hence, a stable rotation is ensured. Moreover, opposite ends of the bearings 162 face the first and second small oil chambers 172 and 173 on the opposite sides of the boss 52a and hence, the bearings 162 can be always put in a well-lubricated state. The first and second small oil chambers 172 and 173 communicate with each other through the bearings 162 and the through-bore 174 and hence, when the amount of oil supplied from the oil pump 44 is small, a large amount of the oil from the upstream supply oil passage 27a to the first small oil chamber 172 is insufficient when the pump impeller 50 intends to draw thereinto by the rotation. However, the oil flows from the second small oil chamber 173 through the through-bore 174 and the bearings 162 into the first small oil chamber 172 to compensate for such insufficiency and hence, it is possible to inhibit the generation of air bubbles in the oil within the torque converter T', to prevent the reduction in transmitting efficiency and to lubricate the bearings 162 effectively.

The first and second oil chambers 172 and 173 may communicate with each other around the bearings 162 through a through-bore 174', or through both of the bearings 162 and the through-bore 174'.

The direct communication between the upstream supply oil passage 27a and the downstream supply oil passage 27b within the crankshaft 2 is cut off by the partition wall 165 between the flow-in bore 175 and the flow-out bore 176. Therefore, the oil supplied from the oil pump 44 to the upstream supply oil passage 27a is forcibly passed within the torque converter T' through the flow-in bore 175 and the flow-out bore 176, and even if the oil pump 44 is of a relatively small capacity, it is possible to prevent the insufficiency of the operating oil in the torque converter T' to the utmost, which is effective for the small-sized vehicle.

Figure 15:
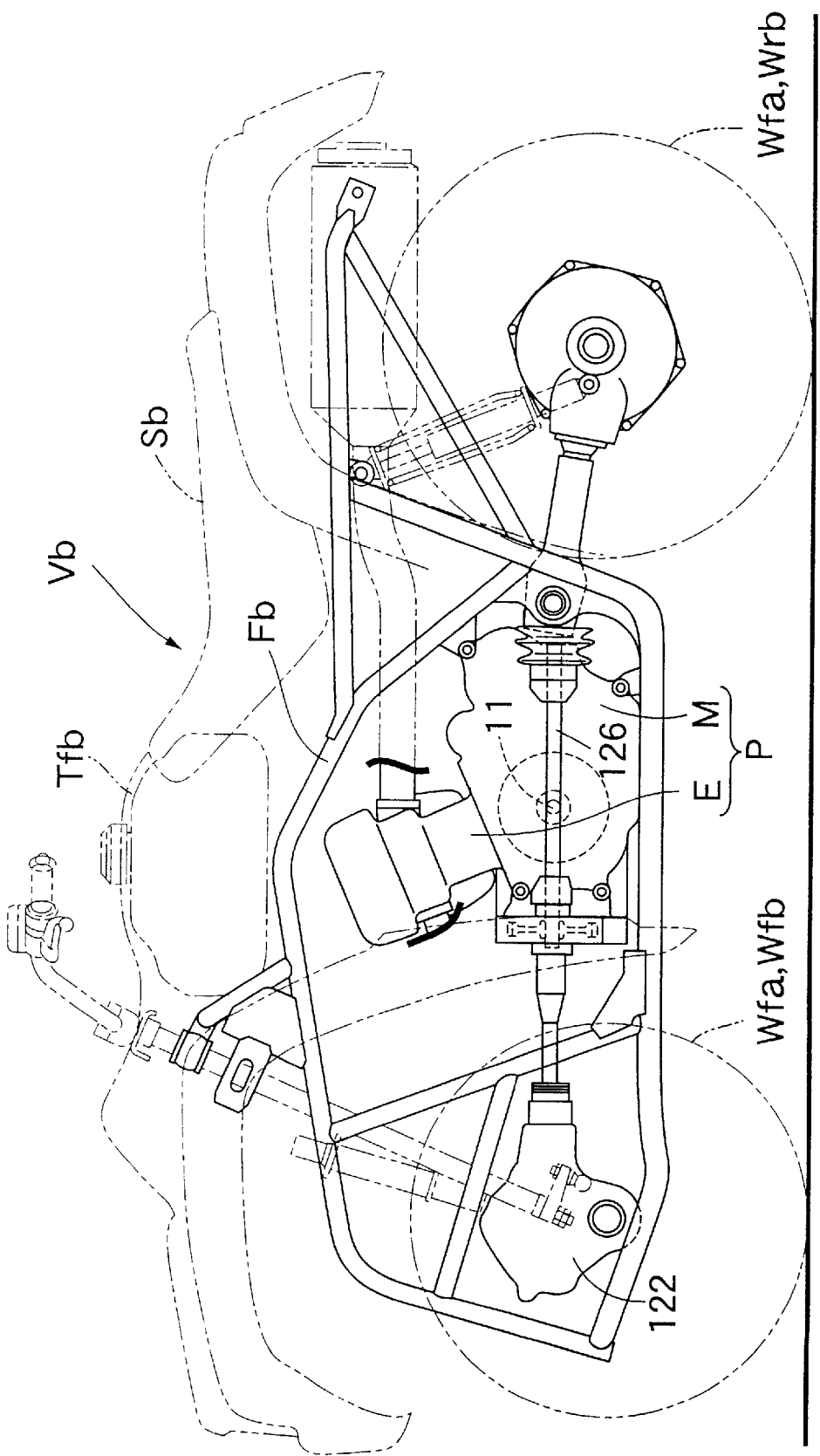

Another arrangement is substantially the same as in the first embodiment, and hence, portions or components corresponding to those in the first embodiment are designated by like reference characters in FIGS. 15 to 17, and the description of them is omitted.

Although the embodiments of the present invention have been described in detail, it will be understood that the present invention is not limited to the above-described embodiments, and various modifications in design may be made without departing from the spirit and scope of the invention defined in claims. For example, the shifting clutch Cc, Cc' is disposed between the engine E and the torque converter T, T' on the transmitting path between the engine E and the primary reducing device 14 in the above-described embodiment, but may be disposed between the torque converter T, T' and the primary reducing device 14. In addition, the torque converter T, T' may be replaced by a fluid coupling which does not have a torque amplifying function.

What is claimed is:

1. A transmitting system for a small-sized vehicle having an engine and a multi-stage transmission said transmitting system comprising a crankshaft of said engine, an input shaft of said multi-stage transmission, a shifting clutch and a primary reducing device, wherein said input shaft is disposed in parallel to said crankshaft and said crankshaft and input shaft are connected to each other through a fluid transmitting means, said fluid transmitting means including a pump impeller leading to said engine, and a turbine impeller leading to said multi-stage transmission, said fluid transmitting means and said shifting clutch being mounted on said crankshaft of said engine and connected in series to each other, one of said fluid transmitting means and said shifting clutch being connected to said crankshaft, and the other being connected to said input shaft of said multi-stage transmission through said primary reducing device; and said crankshaft is provided with an upstream supply oil passage connected to a discharge port in an oil pump driven by said engine, a downstream supply oil passage connected to portions to be lubricated around said crankshaft, a flow-in bore which permits said upstream supply oil passage to communicate with an oil chamber defined between the pump impeller and said turbine impeller of the fluid transmitting means, and a flow-out bore which permits said oil chamber between the pump impeller and said turbine impeller to communicate with said downstream supply oil passage.

2. A transmitting system for a small-sized vehicle according to claim 1, wherein said crankshaft has an orifice provided therein to permit the direct communication between said upstream and downstream supply oil passages.

3. A transmitting system for a small-sized vehicle according to claim 1, further including a partition wall provided between said flow-in bore and said flow-out bore for partitioning the upstream and downstream supply oil passages from each other.

4. A transmitting system for a small-sized vehicle according to any of claims 1 to 3, wherein said fluid transmitting means comprises a torque converter which is comprised of a pump impeller connected to an input side, a turbine impeller connected to an output side, and a stator impeller connected to a stationary structure through a free wheel, said stator impeller having a boss which is rotatably carried on said crankshaft; and a first small oil chamber is provided on one side of said boss to permit said flow-in bore to communicate with an oil chamber defined between said pump impeller and said turbine impeller, and a second small oil chamber is provided on the other side of said boss to permit the oil chamber defined between said pump impeller and said turbine impeller to communicate with said flow-out bore, said first and second small oil chambers being put into communication with each other.

5. A transmitting system for a small-sized vehicle according to claim 4, further including bearings interposed between said crankshaft and said boss for permitting the communication between said first and second small oil chambers.

* * * * *